US011904311B2

(12) United States Patent
Haupt et al.

(10) Patent No.: US 11,904,311 B2
(45) **Date of Patent: *Feb. 20, 2024**

(54) FLUIDIC PERISTALTIC LAYER PUMP WITH INTEGRATED VALVES

(71) Applicants: Remus Brix A. Haupt, Encinitas, CA (US); John Harald Holm Arvidsen, Oelstykke (DK)

(72) Inventors: Remus Brix A. Haupt, Encinitas, CA (US); John Harald Holm Arvidsen, Oelstykke (DK)

( * ) Notice: Subject to any disclaimer, the term of this patent is extended or adjusted under 35 U.S.C. 154(b) by 501 days.

This patent is subject to a terminal disclaimer.

(21) Appl. No.: 16/596,350

(22) Filed: Oct. 8, 2019

(65) Prior Publication Data

US 2020/0038863 A1 Feb. 6, 2020

Related U.S. Application Data

(63) Continuation-in-part of application No. 15/550,105, filed as application No. PCT/US2017/029653 on Apr. 26, 2017, now Pat. No. 10,737,264.

(60) Provisional application No. 62/745,145, filed on Oct. 12, 2018, provisional application No. 62/327,560, filed on Apr. 26, 2016.

(51) Int. Cl.
*B01L 3/00* (2006.01)

(52) U.S. Cl.
CPC ..... *B01L 3/502715* (2013.01); *B01L 3/50273* (2013.01); *B01L 3/502738* (2013.01); *B01L 3/502707* (2013.01)

(58) Field of Classification Search
CPC ............................. B01L 3/50273; F04B 43/12
USPC .................................................. 422/505, 504
See application file for complete search history.

(56) References Cited

U.S. PATENT DOCUMENTS

| | | | |
|---|---|---|---|
| 2,671,412 | A | 3/1954 | Rand |
| 3,038,414 | A | 6/1962 | Margus |
| 3,408,946 | A | 11/1968 | McMillan |
| 4,138,205 | A | 2/1979 | Wallach |
| 4,527,323 | A | 7/1985 | Dawson |
| 5,064,358 | A | 11/1991 | Calari |
| 8,080,220 | B2 | 12/2011 | McAvoy et al. |
| 8,388,908 | B2 | 3/2013 | Blaga et al. |
| 8,524,174 | B2 | 9/2013 | Yobas et al. |
| 9,132,423 | B2 | 9/2015 | Battrell et al. |
| 2013/0287613 | A1 | 10/2013 | Gould et al. |
| 2014/0314602 | A1 | 10/2014 | Richardson et al. |
| 2015/0050172 | A1 | 2/2015 | Haupt et al. |

(Continued)

FOREIGN PATENT DOCUMENTS

| | | | |
|---|---|---|---|
| CN | 10931109 | A | 2/2019 |
| JP | 0006526927 | B1 | 6/2019 |

(Continued)

OTHER PUBLICATIONS

IN201817043928 First Examination Report dated Mar. 18, 2020.

(Continued)

*Primary Examiner* — Natalia Levkovich
(74) *Attorney, Agent, or Firm* — Wagenknecht IP Law Group PC

(57) ABSTRACT

A microfluidic device with at least one integrated valve is provided for managing fluid flow in disposable assay devices, which provides constant flow even at very low flow rates. Pumps utilizing the microfluidic device, as well as methods for manufacture and performing a microfluidic process are also provided.

20 Claims, 17 Drawing Sheets

(56) References Cited

U.S. PATENT DOCUMENTS

| | | | |
|---|---|---|---|
| 2015/0306596 | A1 | 10/2015 | Thompson et al. |
| 2019/0039062 | A1 | 2/2019 | Haupt |

FOREIGN PATENT DOCUMENTS

| | | | |
|---|---|---|---|
| WO | 2014133624 | A2 | 9/2014 |
| WO | 2017189735 | A | 11/2017 |

OTHER PUBLICATIONS

EP17790351.5 Extended European Search Report dated Apr. 1, 2020.

EP17790351.5 Partial Supplementary European Search Report dated Oct. 23, 2019.

KR10-2018-7033856 Notice of Grounds of Rejection dated Dec. 27, 2019.

FLUIDIC PERISTALTIC LAYER PUMP WITH INTEGRATED VALVES

CROSS REFERENCE TO RELATED APPLICATION(S)

This application is a continuation-in-part of U.S. Ser. No. 15/550,105, filed Aug. 10, 2017, now pending, which is a US national phase application under 35 U.S.C. § 371 of International Application No. PCT/US2017/029653, filed Apr. 26, 2017, which claims the benefit of priority under 35 U.S.C. § 119(e) of U.S. Ser. No. 62/327,560, filed Apr. 26, 2016. This application also claims the benefit of priority under 35 U.S.C. § 119(e) of U.S. Ser. No. 62/745,145, filed Oct. 12, 2018. The entire content of each of these applications is incorporated herein by reference.

BACKGROUND OF THE INVENTION

Field of the Invention

The invention relates to fluidics technology, and more particularly to a microfluidic multilayer peristaltic pump for control of fluid flow through microchannels.

Background Information

Microfluidic systems are of significant value for acquiring and analyzing chemical and biological information using very small volumes of liquid. Use of microfluidic systems can increase the response time of reactions, minimize sample volume, and lower reagent and consumables consumption. When volatile or hazardous materials are used or generated, performing reactions in microfluidic volumes also enhances safety and reduces disposal quantities.

Microfluidic devices have become increasingly important in a wide variety of fields from medical diagnostics and analytical chemistry to genomic and proteomic analysis. They may also be useful in therapeutic contexts, such as low flow rate drug delivery.

The microcomponents required for these devices are often complex and costly to produce. For example, a micropump may be used to mix reagents and transport fluids between a disposable analysis platform component of the system and an analysis instrument (e.g., an analyte reader with display functions). Yet controlling the direction and rate of fluid flow within the confines of a microfluidic device, or achieving complex fluid flow patterns inside microfluidic channels is difficult.

SUMMARY OF THE INVENTION

A microfluidic pump has been developed in order to provide low cost, high accuracy means for onboard sample handling in disposable assay devices. Devices utilizing the microfluidic pump, as well as methods for manufacture and performing a microfluidic process are also provided.

Accordingly, in one aspect, the present invention provides a microfluidic device. The microfluidic device includes a rigid body having a first curved slot disposed therein, a rigid substrate having a top surface attached to the rigid body, and comprising a first inlet port and a first outlet port disposed in the top surface and positioned in alignment with a first end and a second end of the first curved slot, and a first elastic member disposed within the first curved slot and having a first surface and a second surface, wherein the second surface comprises a groove defining a first channel with the rigid substrate, and at least one first valve positioned in alignment with the first inlet port, first outlet port, or both the inlet port and the outlet port. In various embodiments, the at least one first valve comprises a valve seat disposed within the bottom surface of the rigid substrate, wherein the bottom surface of the rigid substrate further comprises an annular ring disposed in alignment with the first slot, and wherein a flexible layer is fixedly attached to the annular ring. In various embodiments, the at least one first valve comprises a valve seat disposed within a flexible substrate fixedly attached to the rigid substrate. In various embodiments, the first valve comprises a first valve seat disposed within the rigid substrate, wherein a flexible layer comprising a second valve seat is fixedly attached to the rigid substrate, and wherein the first valve seat and second valve seat are in alignment with one another. The flexible layer may be formed from a thermoplastic elastomer or plastic foil, and may be laser welded to the annular ring. In various embodiments, the flexible layer and the first elastic member are formed as a single unit. In various embodiments, a recess may be disposed in the top surface of the rigid substrate and positioned in alignment with the curved slot of the rigid body.

In various embodiments, the microfluidic device may further include an inlet connector and an outlet connector, each being respectively in fluid communication with the inlet port and outlet port of the rigid substrate. The inlet connector and the outlet connector may be disposed on a side surface of the rigid substrate. The curved slot may have a fixed radius of curvature relative to a center of the rigid body or may have an increasing or decreasing radius of curvature that increases or decreases relative to a center of the rigid body. The top surface of the first elastic member may extend above a top surface of the rigid body.

In certain embodiments, the microfluidic device may further include one or more second curved slots disposed in the rigid body and positioned substantially in parallel to the first curved slot, one or more second elastic members, each disposed within the one or more second curved slots and having a first surface and a second surface, wherein the second surface of each of the one or more second elastic members comprises a groove defining one or more second channels with the rigid substrate, and one or more second inlet ports and outlet ports disposed in the rigid body and positioned in alignment with respective ends of the one or more second curved slots, and one or more second valves disposed in the bottom surface of the rigid support and positioned in alignment with the second inlet ports, the second outlet ports, or both the inlet ports and the outlet ports. In various embodiments, one or more second recesses may be disposed in the top surface of the rigid substrate and positioned in alignment with the one or more second curved slots of the rigid body.

In another aspect, the invention provides a microfluidic device. The microfluidic device includes a rigid substrate having a top surface and a bottom surface, and comprising an aperture disposed therethrough, a first groove formed within a portion of an inner surface of the aperture, a first inlet port and a first outlet port formed at first and second ends of the first groove, a collar fixedly attached to the aperture and comprising a first curved slot formed within an inner surface thereof, wherein the first curved slot is positioned in alignment with the first groove of the aperture, and a first elastic member disposed within the first curved slot and configured to form a first channel with the first groove of the aperture, and one or more first valves positioned in alignment with the first inlet port, the first outlet port, or both the first inlet port and the first outlet port. In various embodiments, a recess may be formed along a surface of the first elastic member that is adjacent to the first groove. In various embodiments, the at least one first valve comprises a valve seat disposed within the bottom surface of the rigid substrate, wherein the bottom surface of the rigid substrate further comprises an annular ring disposed in alignment with the first slot, and wherein a flexible layer is fixedly attached to the annular ring. In various embodiments, the first valve comprises a valve seat disposed within a flexible layer fixedly attached to the rigid substrate. In various embodiments, the first valve comprises a first valve seat disposed within the rigid substrate, wherein a flexible layer comprising a second valve seat is fixedly attached to the rigid substrate, and wherein the first valve seat and second valve seat are in alignment with one another. The flexible layer may be formed from a thermoplastic elastomer or plastic foil, and may be laser welded to the annular ring. In various embodiments, the flexible layer and the first elastic member are formed as a single unit.

In various embodiments, the microfluidic device may further include an inlet connector and an outlet connector, each being respectively in fluid communication with the first inlet port and the first outlet port of the first groove. In various embodiments, the microfluidic device may further include an inlet connector and an outlet connector, each being respectively in fluid communication with the inlet port and outlet port of the rigid substrate. The inlet connector and the outlet connector may be disposed on a side surface of the rigid substrate. The elastic member may be bonded to the first curved slot of the collar. In various embodiments, the collar may include a flange extending away from the aperture and configured to fit within an annular ring formed in the top surface of the rigid substrate. The top surface of the collar may extend above the top surface of the rigid substrate.

In certain embodiments, the microfluidic device may further include one or more second grooves formed within a portion of the inner surface of the aperture and positioned substantially parallel to the first groove, one or more second inlet ports and second outlet ports, each formed at first and second ends of the one or more second grooves, one or more second curved slots formed within the inner surface of the collar, each being positioned in alignment with each of the one or more second grooves of the aperture, and one or more second elastic members, each disposed within each of the one or more second curved slots and configured to form one or more second channels with the one or more second grooves of the aperture, and one or more second valves disposed within the rigid substrate and positioned in alignment with the second inlet ports, the second outlet ports, or both the second inlet ports and the second outlet ports. In various embodiments, each of the one or more second elastic members comprises a recess formed along a surface adjacent to each of the second grooves.

In yet another aspect, the invention provides a microfluidic device. The microfluidic device includes a rigid substrate having a top surface and a bottom surface, and comprising an aperture disposed therethrough, a first inlet port and a first outlet port formed within a portion of an inner surface of the aperture, a collar fixedly attached to the aperture and comprising a first curved slot formed within an inner surface thereof, wherein the first curved slot is positioned along a distance of the inner surface, a first elastic member comprising a recess along a length and disposed within the first curved slot, wherein the recess is configured to form a first channel with the inner surface of the aperture, and one or more first valves positioned in alignment with the first inlet port, the first outlet port, or both the first inlet port and the first outlet port. In various embodiments, the microfluidic device also includes an inlet connector and an outlet connector, each being respectively in fluid communication with the first inlet port and the first outlet port. In various embodiments, the first elastic member is bonded to the first curved slot of the collar. In various embodiments, the microfluidic device includes a groove disposed in the inner surface of the aperture and configured to form a channel with the recess. In various embodiments, the first valve comprises a valve seat disposed within the rigid substrate, wherein the rigid substrate further comprises an annular ring disposed in alignment with the aperture, and wherein a flexible layer is fixedly attached to the annular ring. In various embodiments, the first valve comprises a valve seat disposed within a flexible layer fixedly attached to the rigid substrate. In various embodiments, the first valve comprises a first valve seat disposed within the rigid substrate, wherein a flexible layer comprising a second valve seat is fixedly attached to the rigid substrate, and wherein the first valve seat and second valve seat are in alignment with one another.

In yet another aspect, the invention provides a pump that includes one or more microfluidic devices as herein described, a rotatable actuator configured to compress a portion of the surface of the first elastic member into the groove without substantially deforming the groove, and at least one piston configured to apply force onto the valve, wherein the application of force deforms the flexible layer to substantially close the valve. The actuator may be configured to translate along the curved slot. In various embodiments the pump is disposed in fluid communication with a microfluidic analyzer, which may include at least one microchannel configured to receive a liquid sample suspected of containing at least one target and the microchannel comprises at least one reagent for use in determining the presence of the at least one target. In various embodiments, the pump may include 1-8 (i.e., 1, 2, 3, 4, 5, 6, 7, or 8) microfluidic devices. In various embodiments, the pump includes 1 or 3 microfluidic devices.

DETAILED DESCRIPTION OF THE INVENTION

A microfluidic pump and device containing the pump have been developed in order to provide low cost, high accuracy, and low flow rate means for onboard sample handling for disposable assay devices. Advantageously, the rate of fluid flow within the pump is essentially constant even at very low flow rates.

Before the present compositions and methods are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the invention devices and methods corresponding to the scope of each of these phrases. Thus, a device or method comprising recited elements or steps contemplates particular embodiments in which the device or method consists essentially of or consists of those elements or steps.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

Figure 1A:
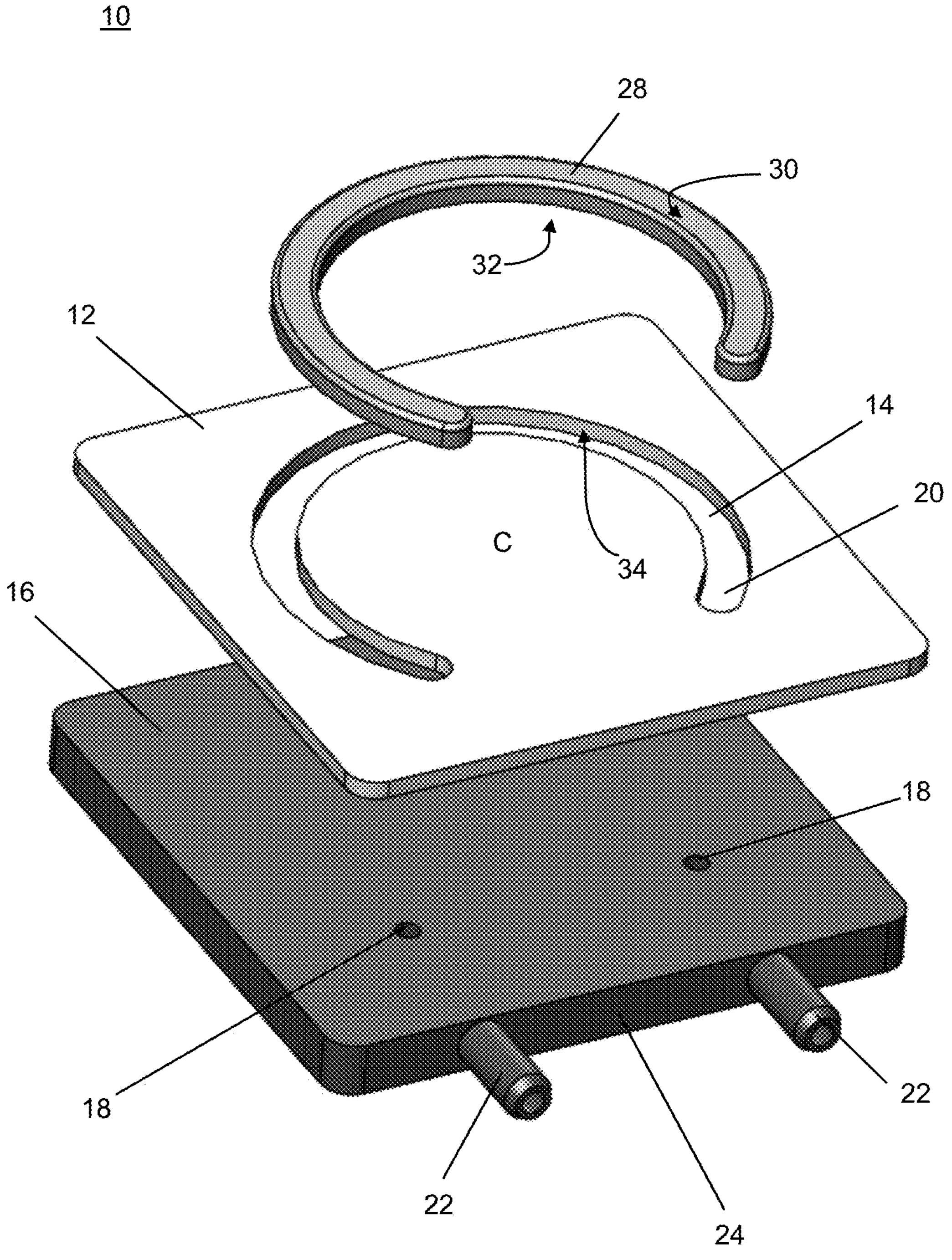
FIGS. 1A and 1B are pictorial diagrams of exemplary embodiments of a microfluidic device.
Figure 1B:
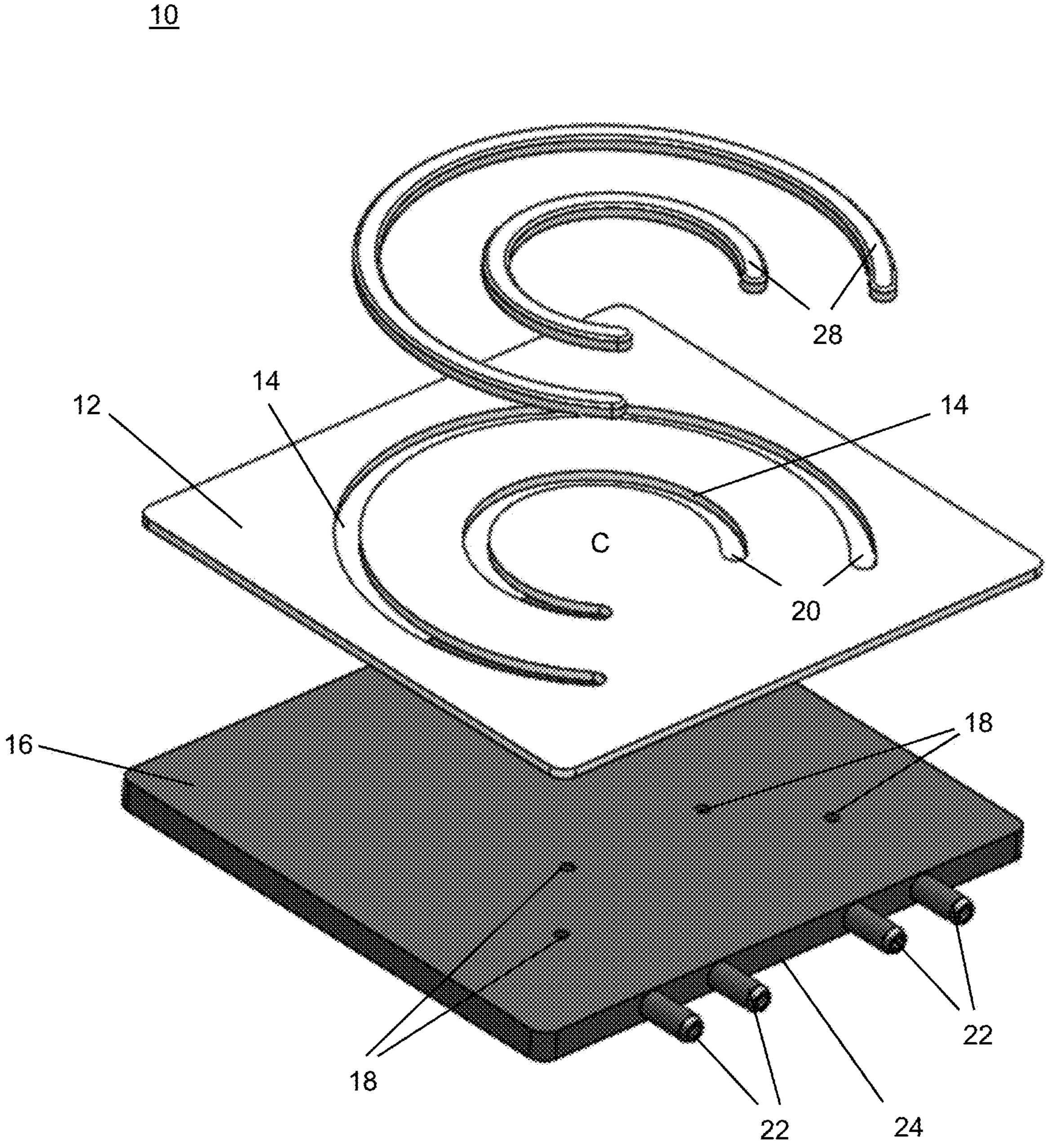

With reference now to FIGS. 1A and 1B, the invention provides a microfluidic device 10 for use in conjunction with a rotary actuator to form a microfluidic pump. The microfluidic device 10 includes a substantially rigid body 12 having one or more curved slots 14 disposed therein. In various embodiments, rigid body 12 may be substantially planar and formed from a non-elastic material such as, but not limited to, metal, plastic, silicon (such as crystalline silicon), or glass. The one or more curved slots 14 may have a fixed radius of curvature (i.e., generally circular) relative to the center C of the rigid body, or may have an increasing or decreasing radius of curvature (i.e., spiral) relative to the center C of the rigid body 12.

One of the surfaces of the rigid body 12 within which the one or more curved slots 14 are cut is attached to a rigid substrate 16, which, like rigid body 12, may be substantially planar and formed from a non-elastic material such as, but not limited to, metal, plastic, silicon (such as crystalline silicon), or glass. In various embodiments, rigid substrate 16 may be formed from the same material as that of rigid body 12, and may be of the same or different thickness as that of rigid body 12. In various embodiments, rigid substrate 16 may be formed from a different material as that of rigid body 12, and may be of the same or different thickness as that of rigid body 12.

Figure 4:
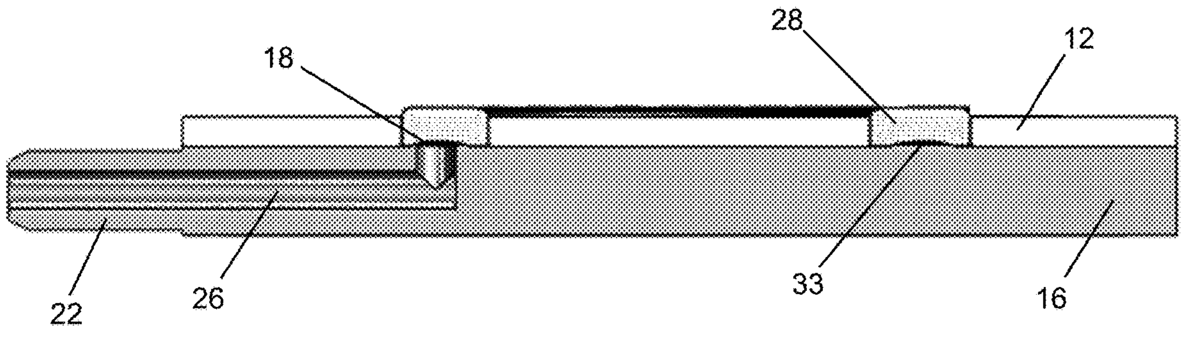
FIG. 4 is a pictorial diagram showing another cross-sectional view of the microfluidic device of FIG. 1.

Rigid substrate 16 includes a pair of ports 18 disposed in the surface of the rigid substrate 16 that attaches to rigid body 12. The ports 18 are positioned in alignment with the end portions 20 of the curved slot 14, and serve as inlet/outlet of the fluid flowing through the microfluidic device 10. It should be understood that in embodiments of microfluidic device 10 that include more than one curved slot 14, rigid substrate 16 may include a pair of ports 18 for each curved slot 14, where each pair of ports 18 is positioned in alignment with the end portions 20 of each corresponding curved slot 14, and each pair of ports 18 is in fluid communication with a pair of corresponding inlet/outlet connectors 22 that is disposed on a surface of the rigid substrate 16. In various embodiments, the pair of inlet/outlet connectors 22 are each formed on a side surface 24 of the rigid substrate 16. In certain embodiments, each of the inlet/outlet connectors 22 are formed on a different side surface of the rigid substrate 16 from one another (not shown). As shown in FIG. 4, rigid substrate 16 may be formed with one or more fluid conduits 26, each defining the fluid communication between ports 18 and inlet/outlet connectors 22.

Provided within the curved slot 14 of the rigid body 12 is an elastic member 28 having a first surface 30 and a second surface 32. Elastic member 28 may be formed from any deformable and/or compressible material, such as, for example, an elastomer, and may be secured to the curved slot 14 of the rigid body 12 to create a fluid-tight seal there between. In various embodiments, elastic member 28 is bonded to an inner surface 34 of the curved slot 14 and/or may be bonded to the surface of the rigid body upon which the rigid substrate 16 is attached.

A variety of methods may be utilized to bond the elastic member 28 to the rigid body 12 and/or attach the rigid body 12 to the rigid substrate 16. The parts may be joined together using UV curable adhesive or other adhesives that permit for movement of the two parts relative one another prior to curing of the adhesive/creation of bond. Suitable adhesives include a UV curable adhesive, a heat-cured adhesive, a pressure sensitive adhesive, an oxygen sensitive adhesive, and a double-sided tape adhesive. Alternatively, the parts may be coupled utilizing a welding process, such as, an ultrasonic welding process, a thermal welding process, and a torsional welding process. In a further alternative, the parts may be joined using a process of two-shot molding or overmolding, in which case first one polymer and then the other is injected into a mold tool to form a singular piece. One of skill in the art will readily appreciate that elastomeric and non-elastomeric polymers can be joined in this way to achieve fluid tight seals between the parts.

Figure 2A:
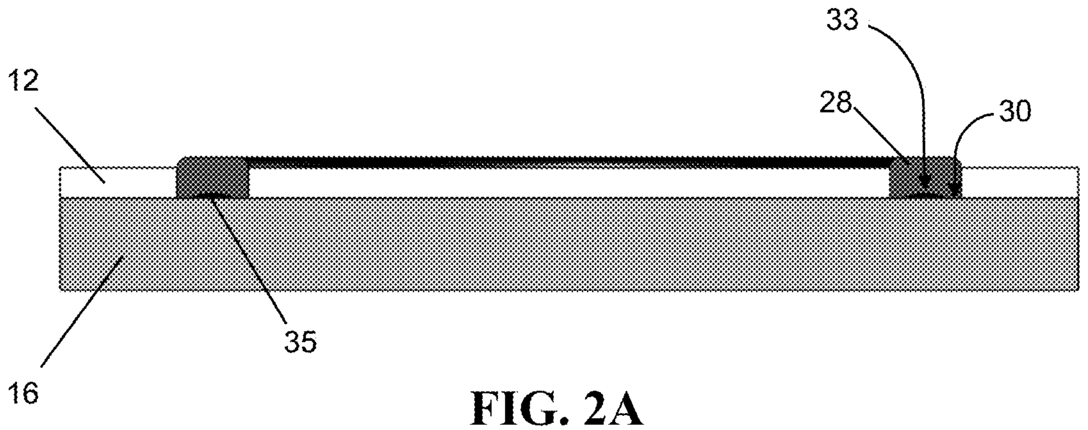
FIGS. 2A and 2B are pictorial diagrams showing a cross-sectional view of the microfluidic devices of FIGS. 1A and 1B, respectively.
Figure 2B:
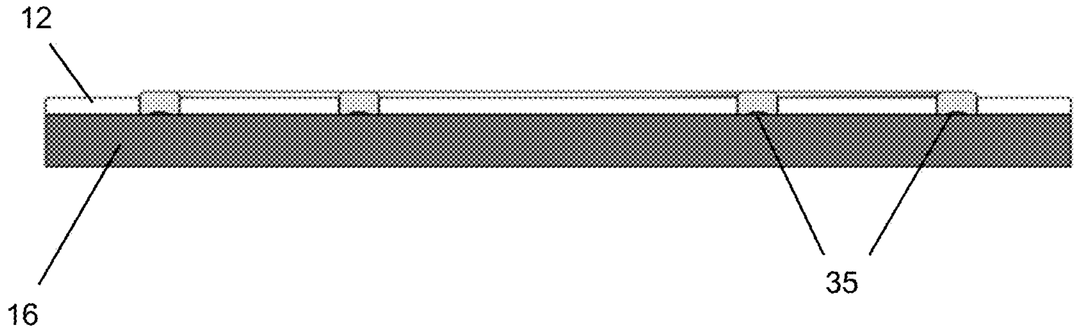
Figure 3:
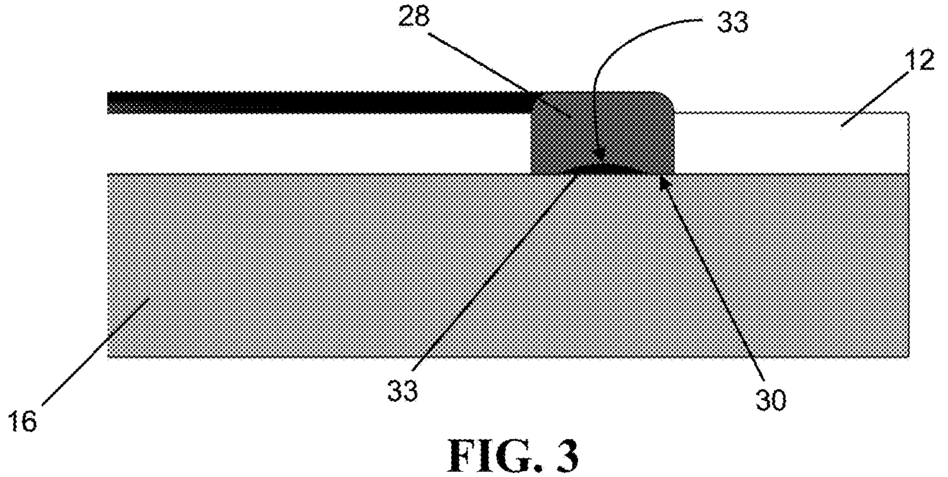
FIG. 3 is a pictorial diagram showing a close-up view of the cross-section of FIG. 2.

With reference now to FIGS. 2A, 2B, and 3, the second surface 32 of the elastic member 28 may include a groove 33 disposed therein, which, when the rigid body 12 is attached to the rigid substrate 16, defines a channel 35 within which fluid may flow during use. Alternatively, or in addition thereto, channel 35 may be defined by a recess 31 disposed within rigid substrate 16 in alignment with the curved slot 14 of rigid body 12. When a force, for example via a deformation element such as roller or actuator, is applied to the elastic member 28, at least a portion of the elastic member 28 is compressed into the channel 35 formed with the rigid substrate 16, thereby occluding at least a portion of the channel 35 at the site of compression.

In the compressed state, the elastic member 28 typically occludes a sufficient portion of the channel 35 to displace a substantial portion of fluid from channel 35 at the site of compression. For example, elastic member 28 may occlude a sufficient portion of channel 35 to separate fluid disposed within channel 35 on one side of the site of compression from fluid disposed within channel 35 on the other side of the site of compression. In various embodiments, elastic member 28 occludes, in the compressed state, at least about 50%, at least about 75%, at least about 90%, at least about 95%, at least about 97.5%, at least about 99%, or essentially all of the uncompressed cross-sectional area of the groove 33 at the site of compression.

The compression may create a fluid-tight seal between the elastic member 28 and rigid substrate 12 within the groove 33 at the site of compression. When a fluid-tight seal is formed, fluid, e.g., a liquid, is prevented from passing along the groove 33 from one side of the site of compression to the other side of the site of compression. The fluid-tight seal may be transient, e.g., the elastic member 28 may fully or partially relax upon removal of the compression, thereby fully or partially reopening groove 33.

The groove 33 may have a first cross-sectional area in an uncompressed state and a second cross-sectional area in the compressed state. In various embodiments, the portion of the elastic member 28 is compressed into the groove 33 without substantially deforming the groove 33. For example, a ratio of the cross-sectional area at the site of compression in the compressed state to the cross-sectional area at the same site in the uncompressed state may be at least about 0.75, at least about 0.85, at least about 0.925, at least about 0.975, or about 1. In various embodiments, the height of the groove 33, e.g., the maximum height of the groove 33 at the site of compression, in the compressed state may be at least about 75%, at least about 85%, at least about 90%, at least about 95%, or about 100% of the height of the groove at the same site in the uncompressed state. In various embodiments, the width of the groove 33, e.g., the maximum width of the groove 33 at the site of compression, in the compressed state may be at least about 75%, at least about 85%, at least about 90%, at least about 95%, or about 100% of the width of the groove 33 at the same site in the uncompressed state.

Figure 9A:
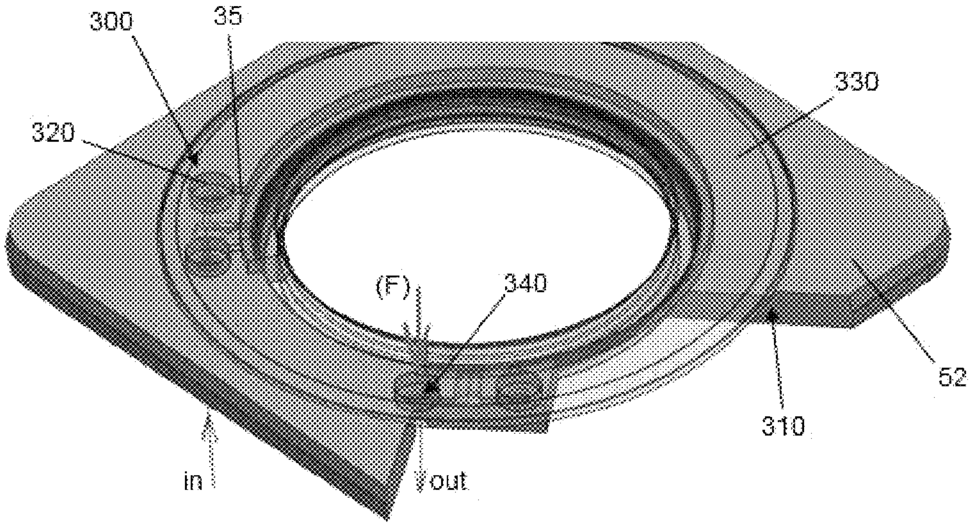
FIGS. 9A-9C are pictorial diagrams showing an exemplary embodiment of a microfluidic valve disposed in a microfluidic device.

Translation of the site of compression along the length of the curved slot 14 creates an effective pumping action resulting in the flow of fluid within the channel 35 in the direction of the advancing deformation element or actuator 102 (see FIG. 9). In some embodiments, the first surface of the elastic member 28 extends above the top surface of the rigid body 12, thereby increasing the thickness of elastomeric material which may aid sealing of the elastic member 28 into the channel 35 when compressed against the rigid substrate 16.

Figure 5A:
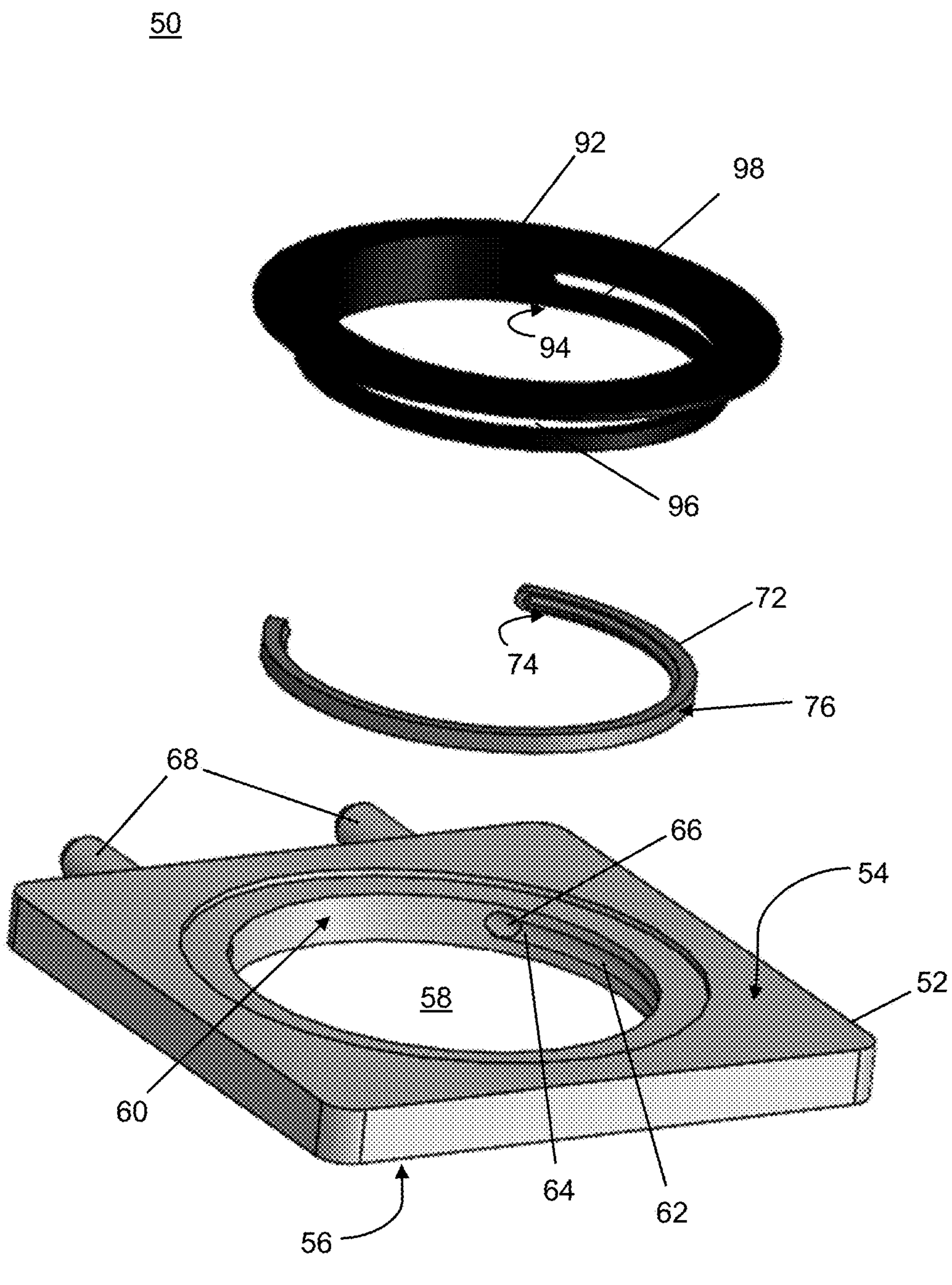
FIGS. 5A-5C are pictorial diagrams showing exemplary embodiments of a microfluidic device.
Figure 5B:
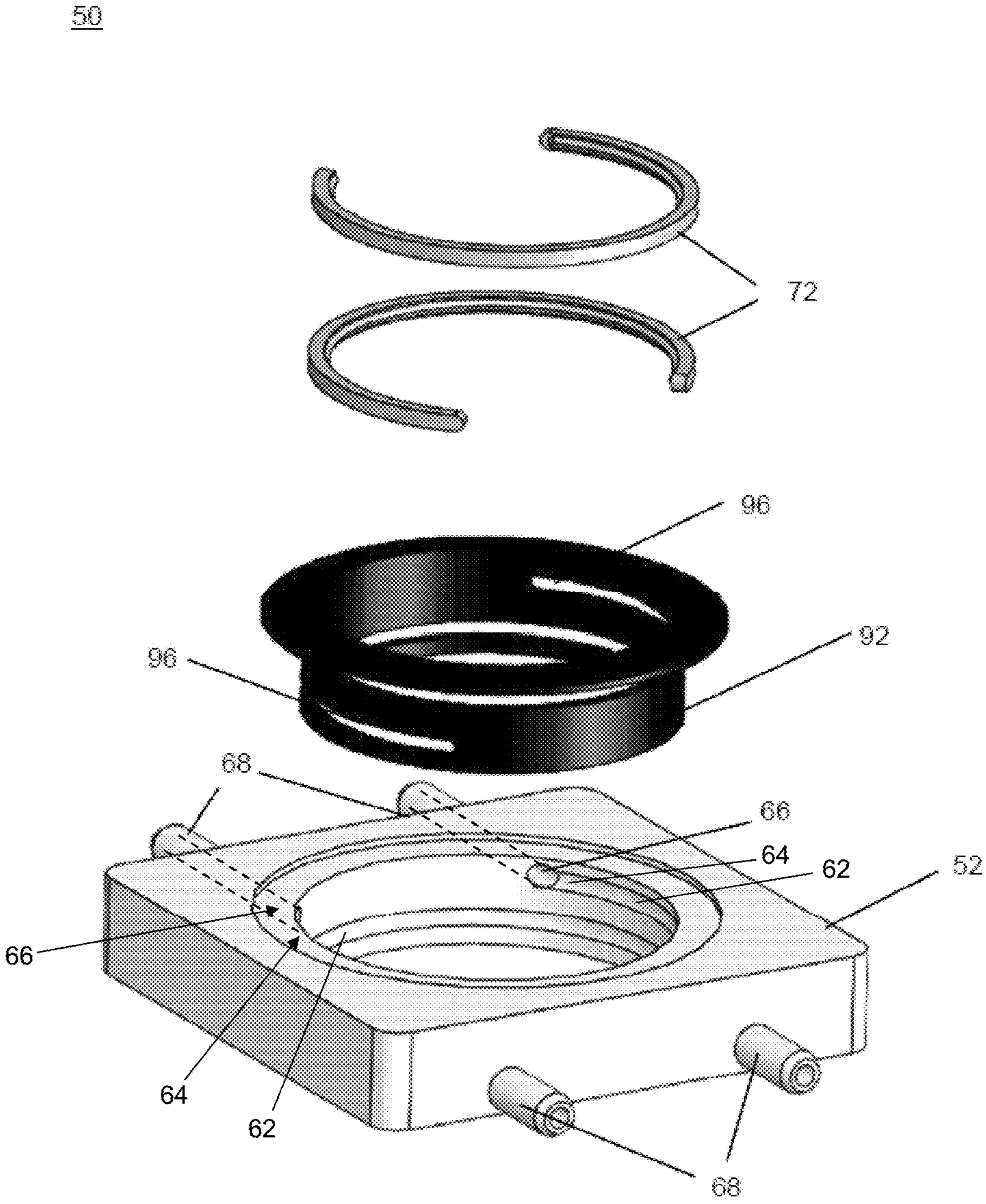
Figure 5C:
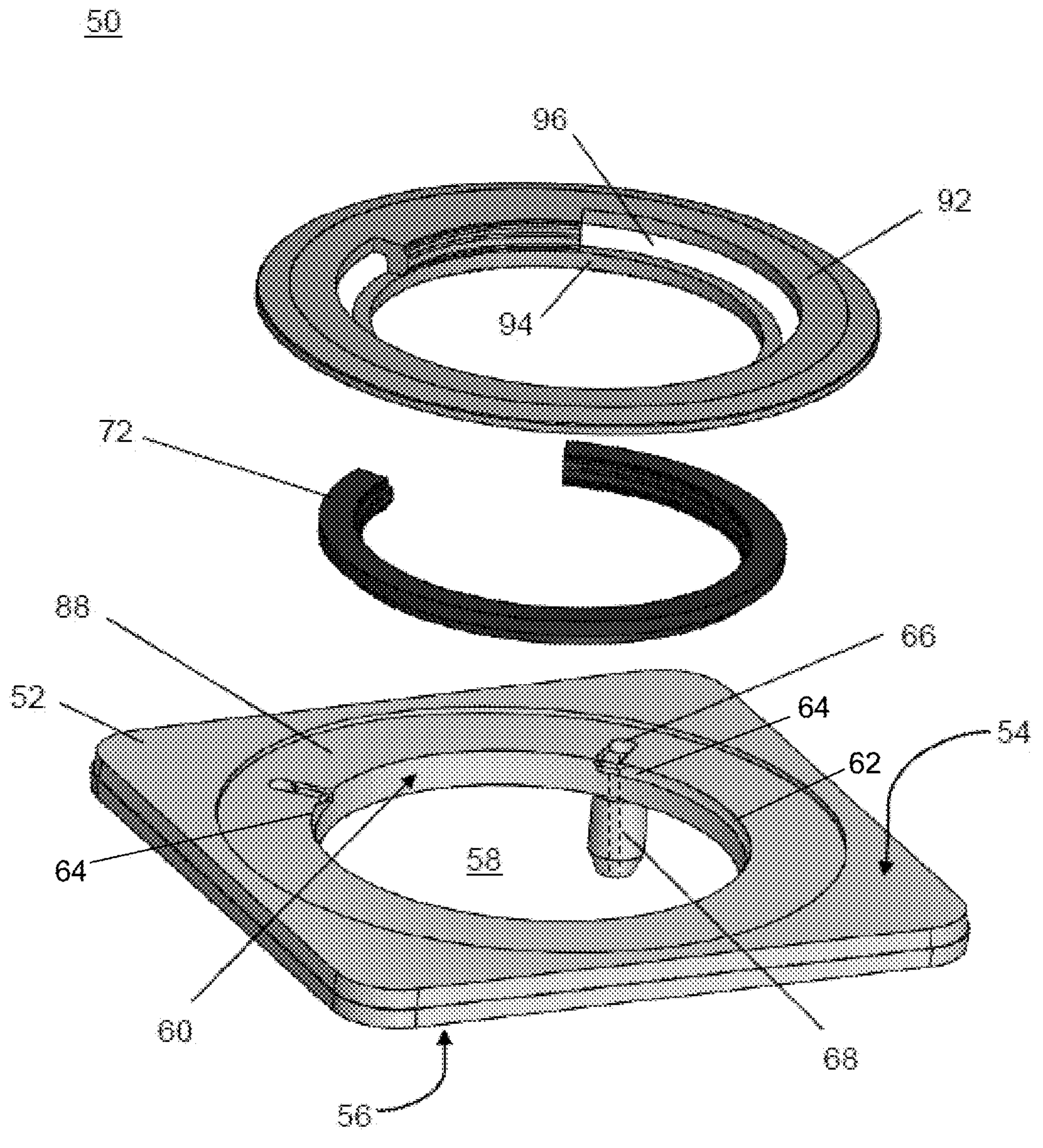

With reference now to FIGS. 5A-5C, 6A-6C, 7A-7C, and 8A-8C, the invention provides a microfluidic device 50 for use in conjunction with a rotary actuator 102 to form a microfluidic pump 100. The microfluidic device 50 includes a substantially rigid substrate 52 having a top surface 54 and a bottom surface 56, with an aperture 58 having an inner surface 60, disposed therethrough. Formed within a portion of inner surface 60 of aperture 58 is one or more grooves 62. In various embodiments, the one or more grooves 62 may be located at a center portion of inner surface 60 (FIGS. 5A, 5B, 6A, and 6B). In various embodiments, the one or more grooves 62 may be formed along a top edge or bottom edge of inner surface 60 adjacent to the top surface 54 or bottom surface 56 of rigid substrate 52 (FIG. 5C).

Thus, in this configuration, the microfluidic pump 100 does not rely upon force being directed toward the top surface of rigid body 12 of the microfluidic device 50 for pumping actuation, but rather, forces directed away from the center C of aperture 58 and toward the inner surface 60 of rigid substrate 52 are used to actuate pumping action. Likewise, the configuration provides the added advantage of reducing manufacturing costs and facilitating assembly thereof. In various embodiments, rigid substrate 52 may be substantially planar and formed from a non-elastic material such as, but not limited to, metal, plastic, silicon (such as crystalline silicon), or glass.

Figure 6A:
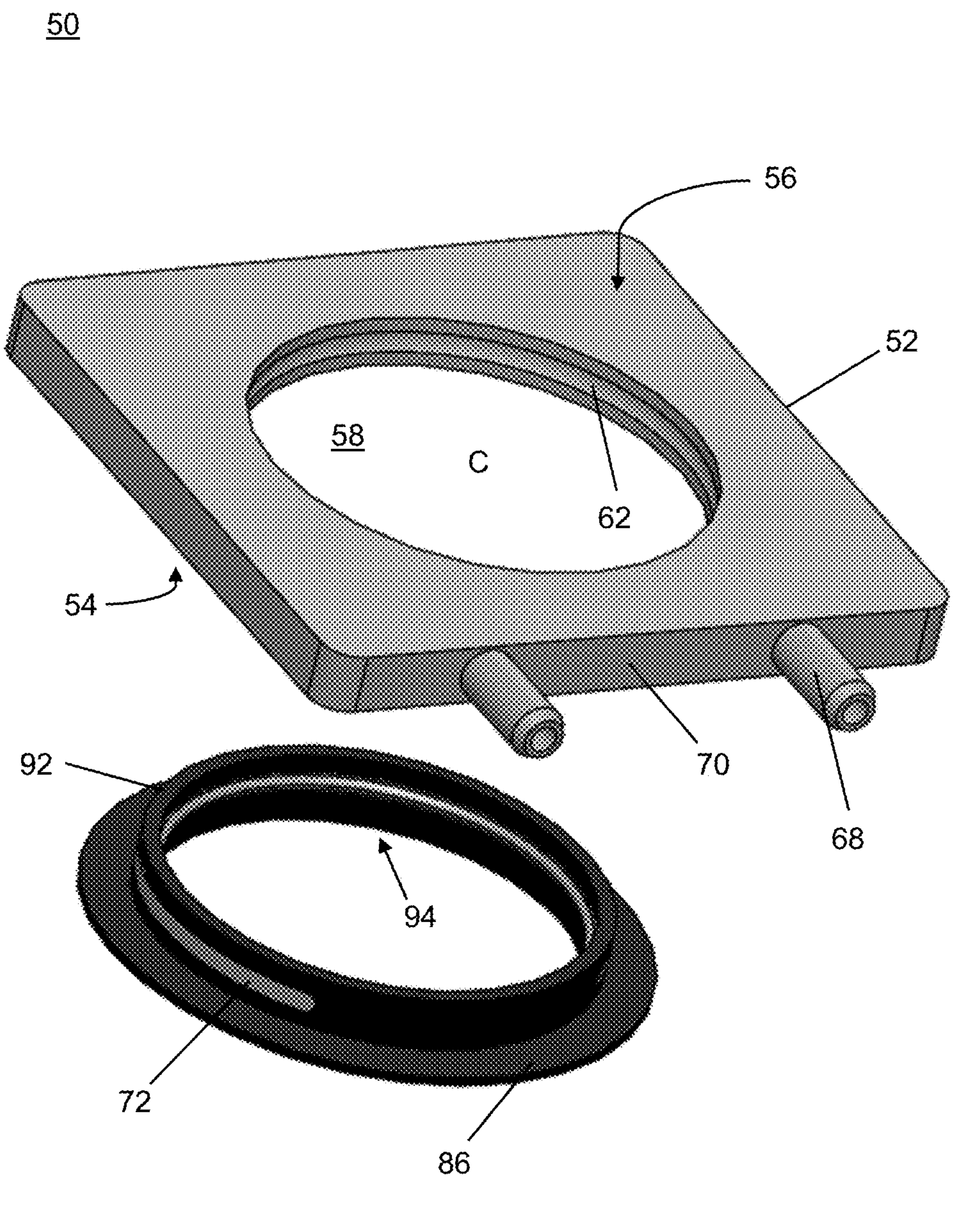
FIGS. 6A-6C are pictorial diagram showings bottom views of the microfluidic devices of FIGS. 5A-5C, respectively.
Figure 6B:
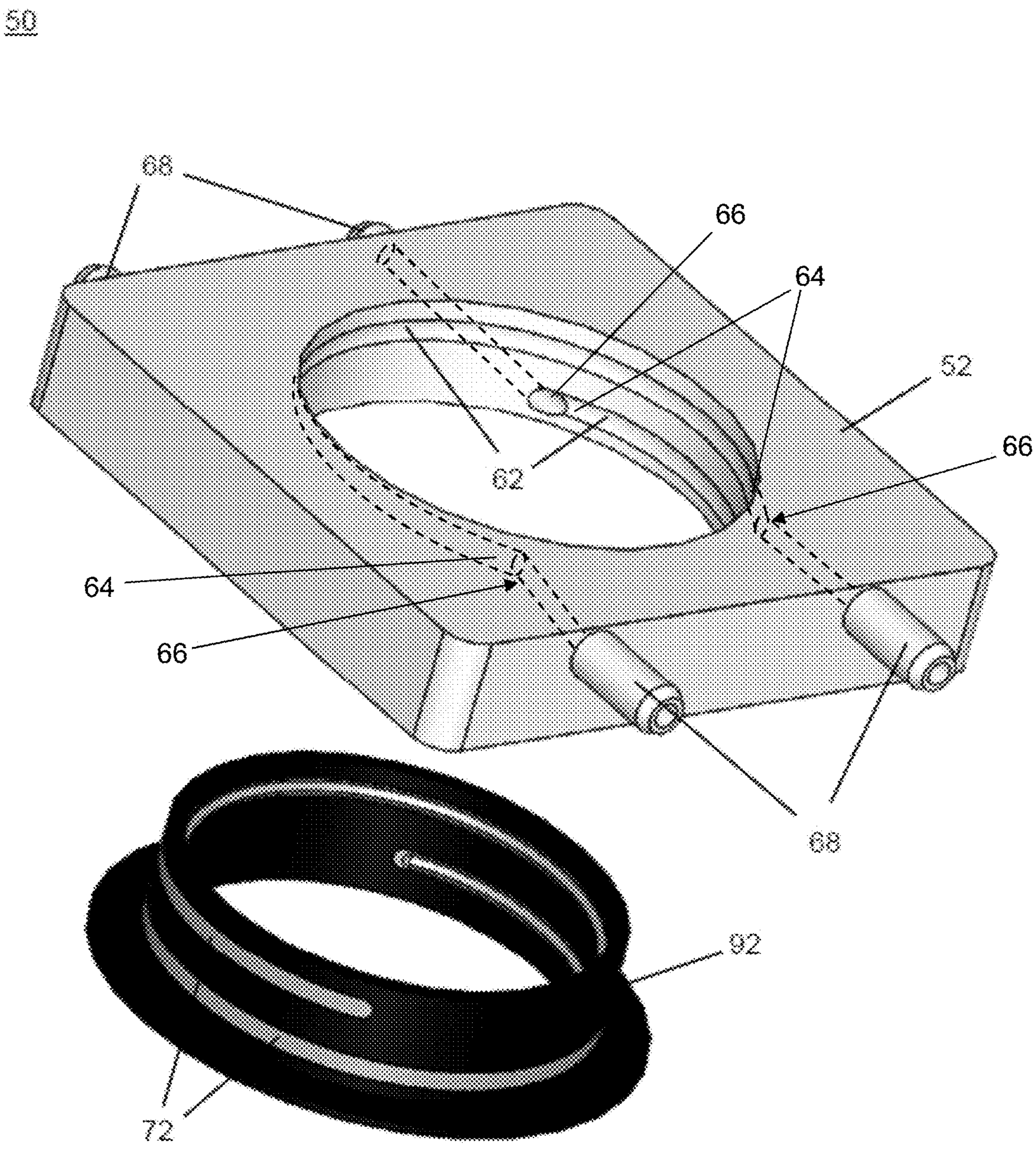
Figure 6C:
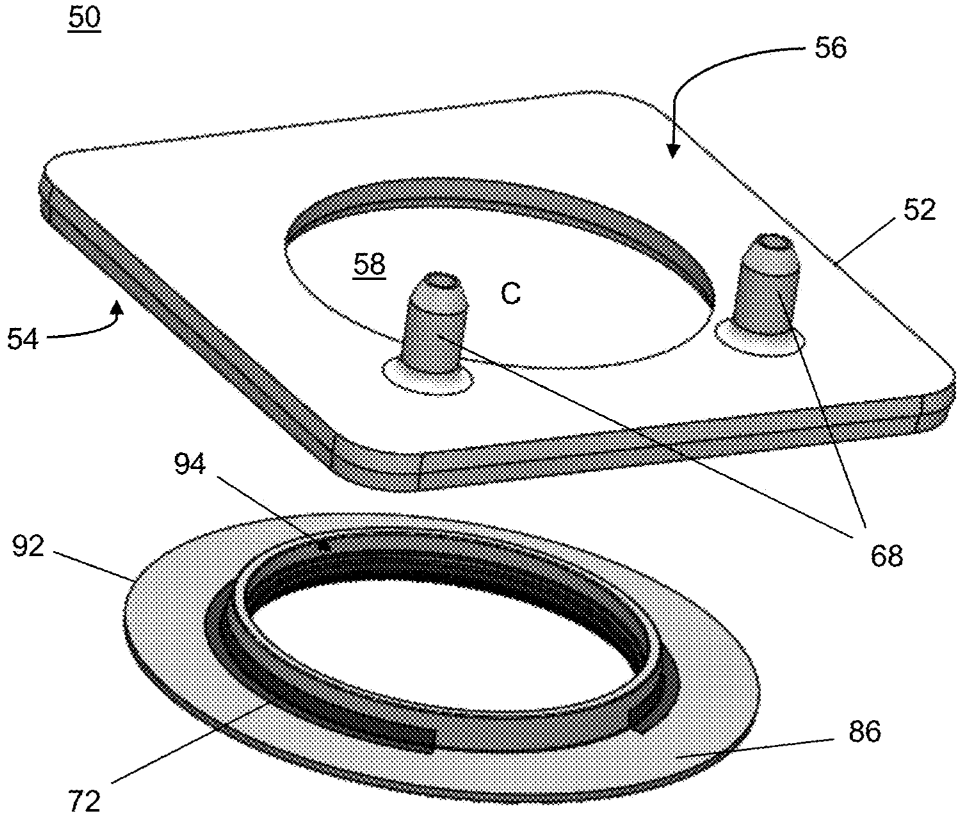
Figure 7A:
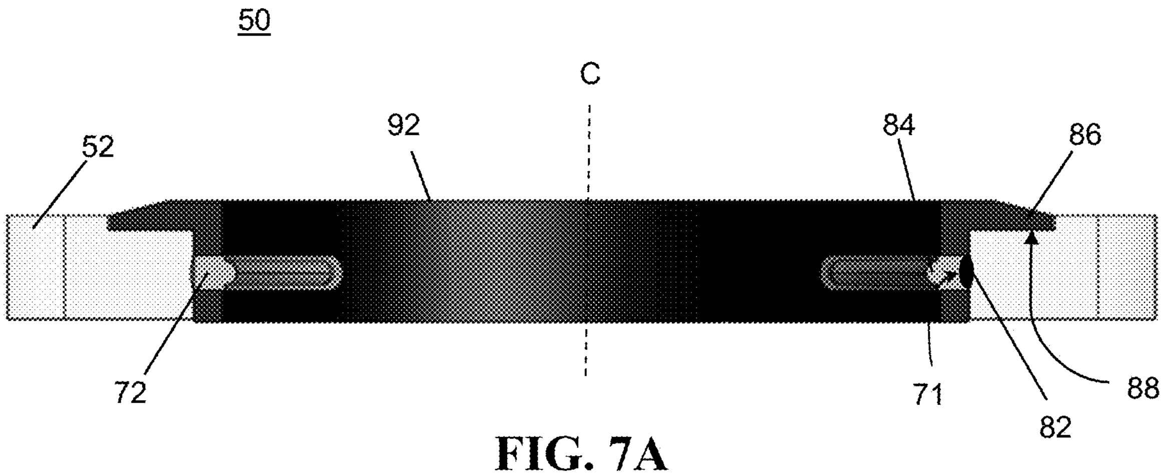
FIGS. 7A-7B are pictorial diagrams showing cross-sectional views of the microfluidic device of FIG. 5A showing the defined channel.
Figure 7B:
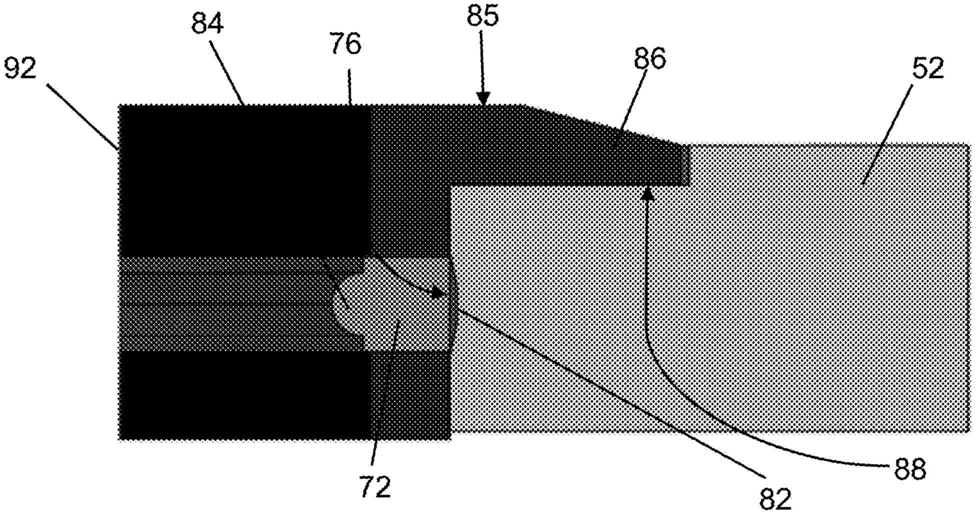
Figure 7C:
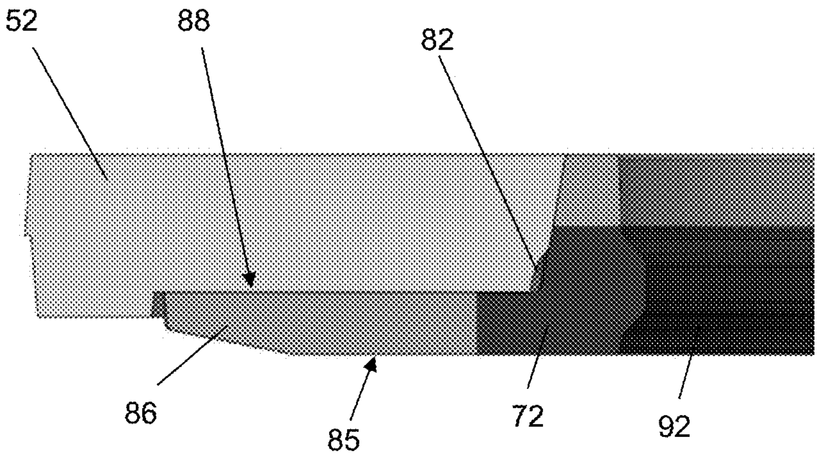
FIG. 7C is a cross-sectional view of the microfluidic device of FIG. 5C showing the defined channel.

Disposed at both end portions 64 of groove 62 are ports 66, which are each in fluid communication with a respective inlet/outlet connector 68 formed on a surface (i.e., top surface 54, bottom surface 56, or side surface 70) of rigid substrate 52. It should be understood, that in embodiments of microfluidic device 50 that include more than one groove 62 disposed within inner surface 60 of aperture 58, each groove 62 will be substantially parallel to one another, and will include a pair of ports 66 disposed at both end portions 64, which in turn, are in fluid communication with a respective pair of inlet/outlet connectors 68 formed on a surface (i.e., top surface 54, bottom surface 56, or side surface 70) of rigid substrate 52. In various embodiments, the pair of inlet/outlet connectors 68 are each formed on a side surface 70 of the rigid substrate 52 (FIGS. 5A and 5B). In various embodiments, the pair of inlet/outlet connectors 68 are each formed on a top surface 54 or bottom surface 56 of the rigid substrate 52 (FIGS. 5C and 6C). In certain embodiments, each of the inlet/outlet connectors 68 are formed on different surfaces of the rigid substrate 52 from one another (i.e., a top surface 54, a bottom surface 56, or two different side surfaces 70).

The microfluidic device 50 further includes a rigid collar 92 that is sized and shaped to fit within the aperture 58 of the rigid support 52. Disposed within an inner surface 94 of collar 92 is one or more curved slots 96, positioned in alignment with each groove 62 of rigid substrate 52. As discussed above, embodiments of microfluidic device 50 that include more than one groove 62 disposed within inner surface 60 of rigid substrate 52 will have a collar 92 that includes a curved slot 96 corresponding to each groove 62.

Provided within the curved slot 96 of the collar 92 is an elastic member 72 having a first surface 74 and a second surface 76. Elastic member 72 may be formed from any deformable and/or compressible material, such as, for example, an elastomer, and may be secured to the curved slot 96 of the collar 92 to create a fluid-tight seal therebetween. In various embodiments, elastic member 72 is bonded to an inner surface 98 of the curved slot 96 and/or may be bonded to the inner surface 94 of the collar 92.

Figure 8A:
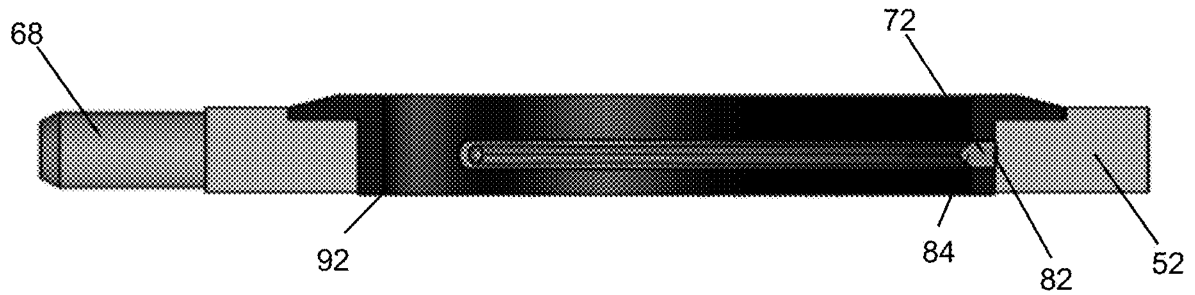
FIGS. 8A-8C are pictorial diagrams showing cross-sectional views of the microfluidic devices of FIGS. 5A-5C, respectively.
Figure 8B:
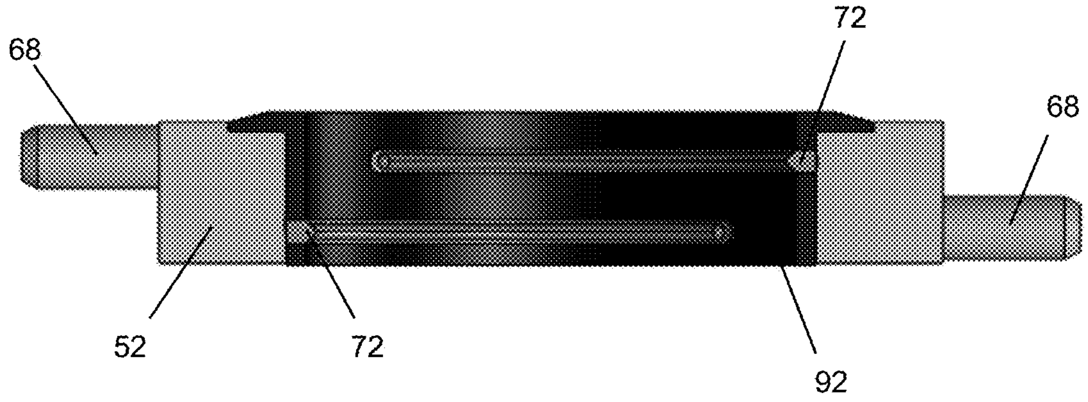
Figure 8C:

In various embodiments, collar 92 may comprise a flange 86 disposed around the periphery thereof and extending away from the center C of aperture 58. The flange 86 may be sized and shaped to fit within an annular ring 88 formed within the top surface 54 or bottom surface 56 of the rigid body 52. Referring now to FIGS. 8A-8C, in various embodiments, when collar 92 is attached to rigid body 52, the top surface 85 of flange 86 extends above the top surface 54 of rigid body 52. In various embodiments, when collar 92 is attached to rigid body 52, the top surface 85 of flange 86 is flush with the top surface 54 (or bottom surface 56) of rigid body 52.

A variety of methods may be utilized to bond the elastic member 72 to the collar 92 and/or attach the collar 92 to the rigid substrate 52. As discussed above, the parts may be joined together using UV curable adhesive or other adhesives that permit for movement of the two parts relative one another prior to curing of the adhesive/creation of bond. Suitable adhesives include a UV curable adhesive, a heat-cured adhesive, a pressure sensitive adhesive, an oxygen sensitive adhesive, and a double-sided tape adhesive. Alternatively, the parts may be coupled utilizing a welding process, such as, an ultrasonic welding process, a thermal welding process, and a torsional welding process. In a further alternative, the parts may be joined using a process of two-shot molding or overmolding, in which case first one polymer and then the other is injected into a mold tool to form a singular piece. One of skill in the art will readily appreciate that elastomeric and non-elastomeric polymers can be joined in this way to achieve fluid tight seals between the parts.

Referring back to FIGS. 7A-7C, when collar 92 is attached to the rigid substrate 52, the second surface 76 of the elastic member 72 defines a channel 82 with groove 62 within which fluid may flow during use. Alternatively, or in addition thereto, the second surface 76 of the elastic member 72 may also include a recess 71 formed along its length such that channel 82 may be defined by groove 62, recess 71, or both groove 62 and recess 71. When a force, for example via a deformation element such as roller or actuator, is applied to the elastic member 72, at least a portion of the elastic member 72 is compressed into the channel 82 formed with groove 62 and/or recess 71, thereby occluding at least a portion of the channel 82 at the site of compression. In various embodiments, the second surface 76 of elastic member 72 may be substantially flat or may be concave (i.e., may have recess 71 disposed along its length) to further define the channel 82.

As above, in the compressed state, the elastic member 72 typically occludes a sufficient portion of the channel 82 to displace a substantial portion of fluid from channel 82 at the site of compression. For example, elastic member 72 may occlude a sufficient portion of channel 82 to separate fluid disposed within channel 82 on one side of the site of compression from fluid disposed within channel 82 on the other side of the site of compression. In various embodiments, elastic member 72 occludes, in the compressed state, at least about 50%, at least about 75%, at least about 90%, at least about 95%, at least about 97.5%, at least about 99%, or essentially all of the uncompressed cross-sectional area of the groove 62 at the site of compression.

The compression may create a fluid-tight seal between the elastic member 72 and rigid substrate 52 within the groove 62 at the site of compression. When a fluid-tight seal is formed, fluid, e.g., a liquid, is prevented from passing along the groove 62 from one side of the site of compression to the other side of the site of compression. The fluid-tight seal may be transient, e.g., the elastic member 72 may fully or partially relax upon removal of the compression, thereby fully or partially reopening groove 62.

The groove 62 may have a first cross-sectional area in an uncompressed state and a second cross-sectional area in the compressed state. In various embodiments, the portion of the elastic member 72 is compressed into the groove 62 without substantially deforming the groove 62. For example, a ratio of the cross-sectional area at the site of compression in the compressed state to the cross-sectional area at the same site in the uncompressed state may be at least about 0.75, at least about 0.85, at least about 0.925, at least about 0.975, or about 1. In various embodiments, the width of the groove 62, e.g., the maximum width of the groove 62 at the site of compression, in the compressed state may be at least about 75%, at least about 85%, at least about 90%, at least about 95%, or about 100% of the width of the groove 62 at the same site in the uncompressed state. In various embodiments, the height of the groove 62, e.g., the maximum height of the groove 62 at the site of compression, in the compressed state may be at least about 75%, at least about 85%, at least about 90%, at least about 95%, or about 100% of the width of the groove 62 at the same site in the uncompressed state.

Translation of the site of compression along the length of the curved slot 96 creates an effective pumping action resulting in the flow of fluid within the channel 82 in the direction of the advancing deformation element or actuator (not shown). In some embodiments, the first surface 74 of the elastic member 72 extends toward the center C of aperture 58 beyond the inner surface 94 of collar 92. In certain embodiments, first surface 74 comprises a raised element 84 disposed over a portion or all of the channel 82. Thus, the raised element 84 provides an increased cross-sectional thickness in the area which coincides with the channel 82. This assists in creating a water tight seal between the deformed elastic member 72 advanced into groove 62 with the surface of the channel 82. One skilled in the art would understand that the raised element 84 may be one of a number of suitable shapes such as a bump. In other embodiments, elastic member 72 has no raised element 84.

The channels 35 and 82 may be dimensioned to define the volume within the channel and resultant flow rate for a given rate at which the elastic member 28 and 72 is progressively deformed into the grooves 20 and 62. The high-quality and precision of the so formed grooves 20 and 62 results in a microfluidic device that can achieve very slow and consistent flow rates, which may not otherwise be achieved if alternate processes of manufacture were employed. The channels so formed may be dimensioned such that they have a constant width dimension and a constant depth dimension along all or a portion of their lengths. In certain embodiments, the channels 35 and 82 will have a constant width dimension and a constant depth dimension along a length of the elastic member which engages a deformation element or actuator. In general, a channel 35 and 82 may have a width dimension of between 500 to 900 microns and a depth dimension of between 40 to 100 microns. As such, the device may be adapted for a flow rate within the channel 35 and 82 of between 0.001 μl/s to 5.0 μl/s.

The grooves 20 and 62 and/or recesses 31 and 71 formed in the microfluidic devices described herein may utilize a variety of cross-sectional geometries. While the figures provided herein depict a groove in which one surface of the channel is arced, thereby defining a concave circular geometry, it should be understood that the channels may have a rounded, elliptical or generally U-shaped surface. In one embodiment, the channel has an arced-shaped surface having a radius of curvature of between 0.7 and 0.9 mm. One skilled in the art would appreciate that the surfaces of the channels formed in the microfluidic devices may be modified, for example, by varying hydrophobicity. For instance, hydrophobicity may be modified by application of hydrophilic materials such as surface active agents, application of hydrophobic materials, construction from materials having the desired hydrophobicity, ionizing surfaces with energetic beams, and/or the like.

Figure 9B:
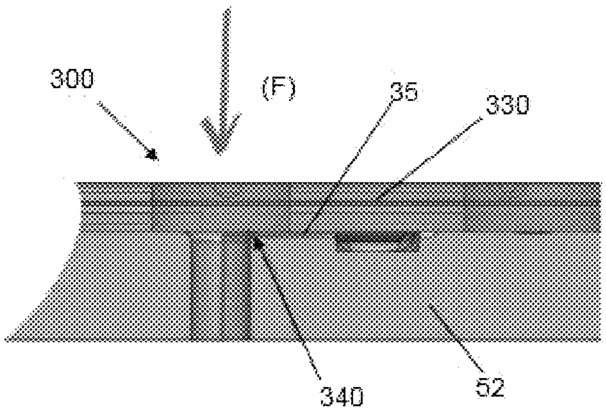
Figure 9C:
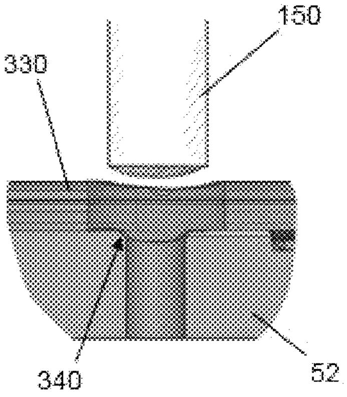

Any of the above-discussed embodiments of microfluidic device (10, 50) may further include one or more valves 300 disposed therein. With reference now to FIGS. 9A-11C, the valve 300 may be disposed within a surface of rigid substrate 52, within a surface of elastic member 72, or may be the result of a combination of being formed in a surface of rigid substrate 52 and elastic member 72, and actuated by a piston 150 of a microfluidic pump 100. In various embodiments, rigid substrate 52 will be formed with an annular ring 310 within which one or more chambers 320, such as mixing chambers, are formed. Disposed over the annular ring 310 is a flexible layer 330 made from, for example, a thermoplastic elastomer or plastic foil. In various embodiments, the flexible layer 330 is bonded or welded to the annular ring 310 of the rigid substrate 52, thereby serving as a cover over the chambers 320. In various embodiments, flexible layer 330 is integral to elastic member 72 and is therefore formed as a single unit with the elastic member 72. As shown in FIGS. 9B and 9C, application of force F onto the flexible layer 330 deforms the flexible layer 330 such that the flow of fluid or gas is interrupted. In various embodiments, a piston 150 of a microfluidic pump 100 may be used to deform the flexible layer 330 at a predetermined time.

As shown in FIG. 9B, the annular ring may include one or more of the above-discussed inlet/outlet connectors 68 such that application of force F onto flexible layer 330 prevents the flow of fluid through the inlet/outlet connector 68 during pumping. In various embodiments, the inlet/outlet connector 68 may further include a valve seat 340 configured to form a seal with the deformed flexible layer 330 upon application of force F by a piston 150.

Figure 10A:
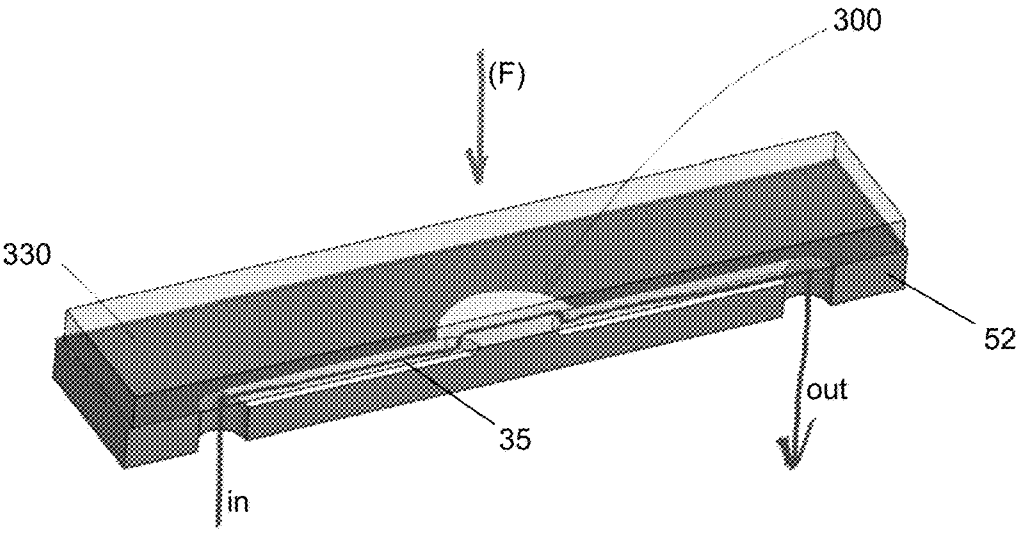
FIGS. 10A-10B are pictorial diagrams showing another exemplary embodiment of a microfluidic valve disposed in a microfluidic device.
Figure 10B:
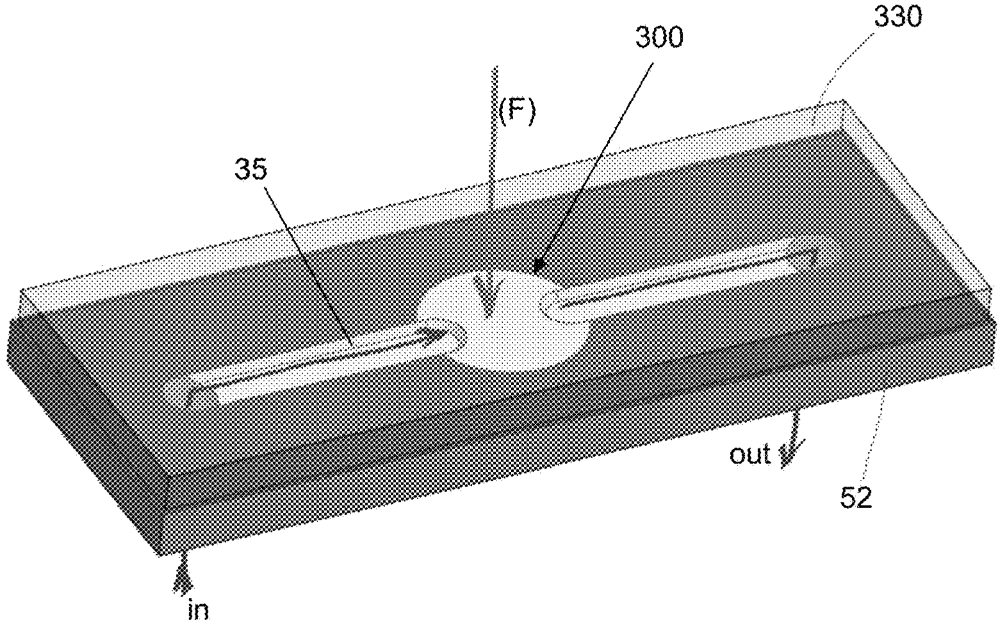

As shown in FIGS. 10A and 10B, the valve 300 may be disposed over a fluid conduit 26 or a channel (35, 82). In such embodiments, the flexible layer 330 may be deformed by application of force F using a piston 150 to prevent fluid from flowing therethrough.

Figure 11A:
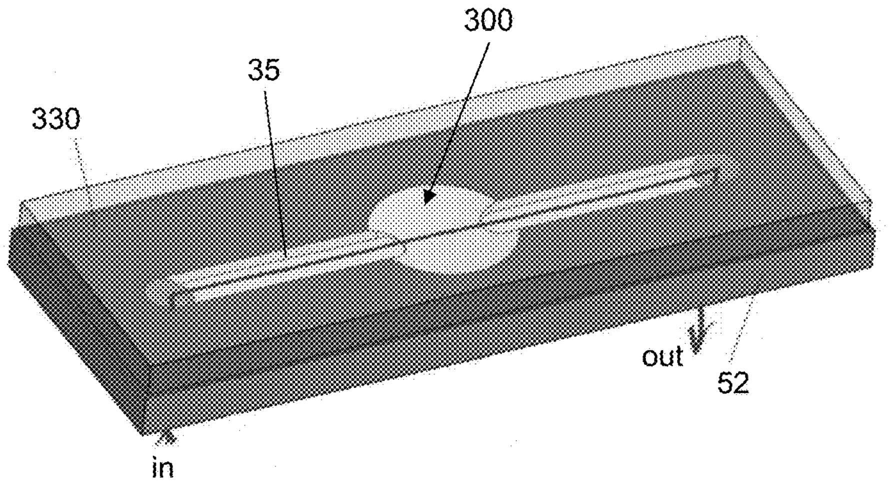
FIGS. 11A-11C are pictorial diagrams showing another exemplary embodiment of a microfluidic valve disposed in a microfluidic device.
Figure 11B:
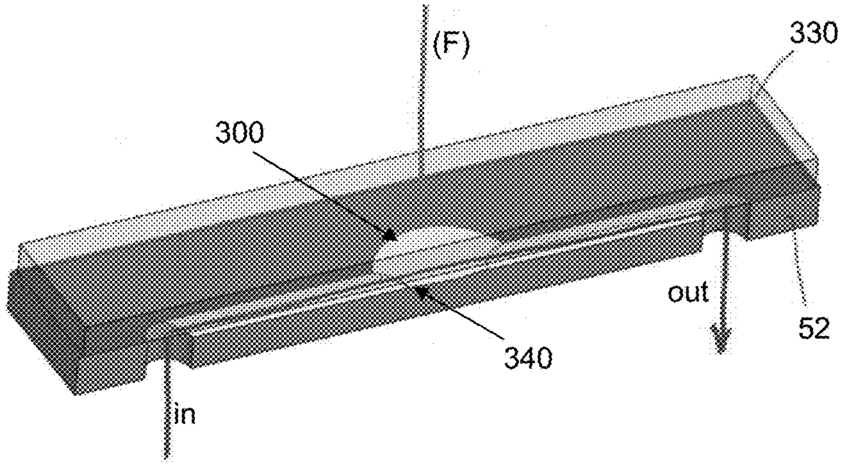
Figure 11C:
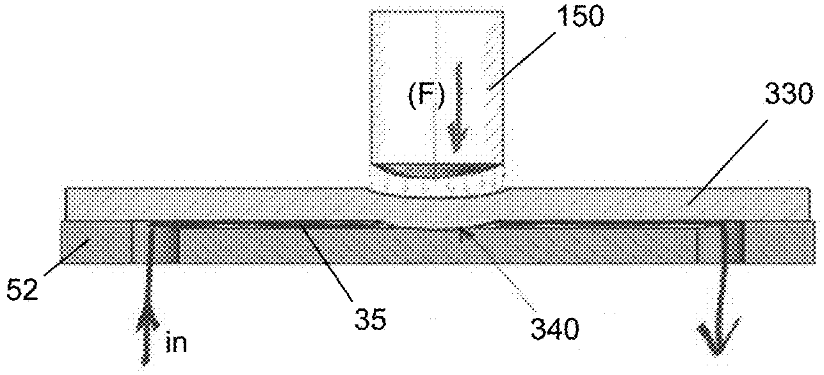

As shown in FIGS. 11A-11C, the valve 300 may be disposed over a vent or fluid conduit 35 configured to allow gas to flow therethrough. As with the previous embodiments of valve 300, the application of force F using a piston 150 onto flexible layer 330 will close the valve 330, thereby preventing the flow of air or gas.

Figure 12A:
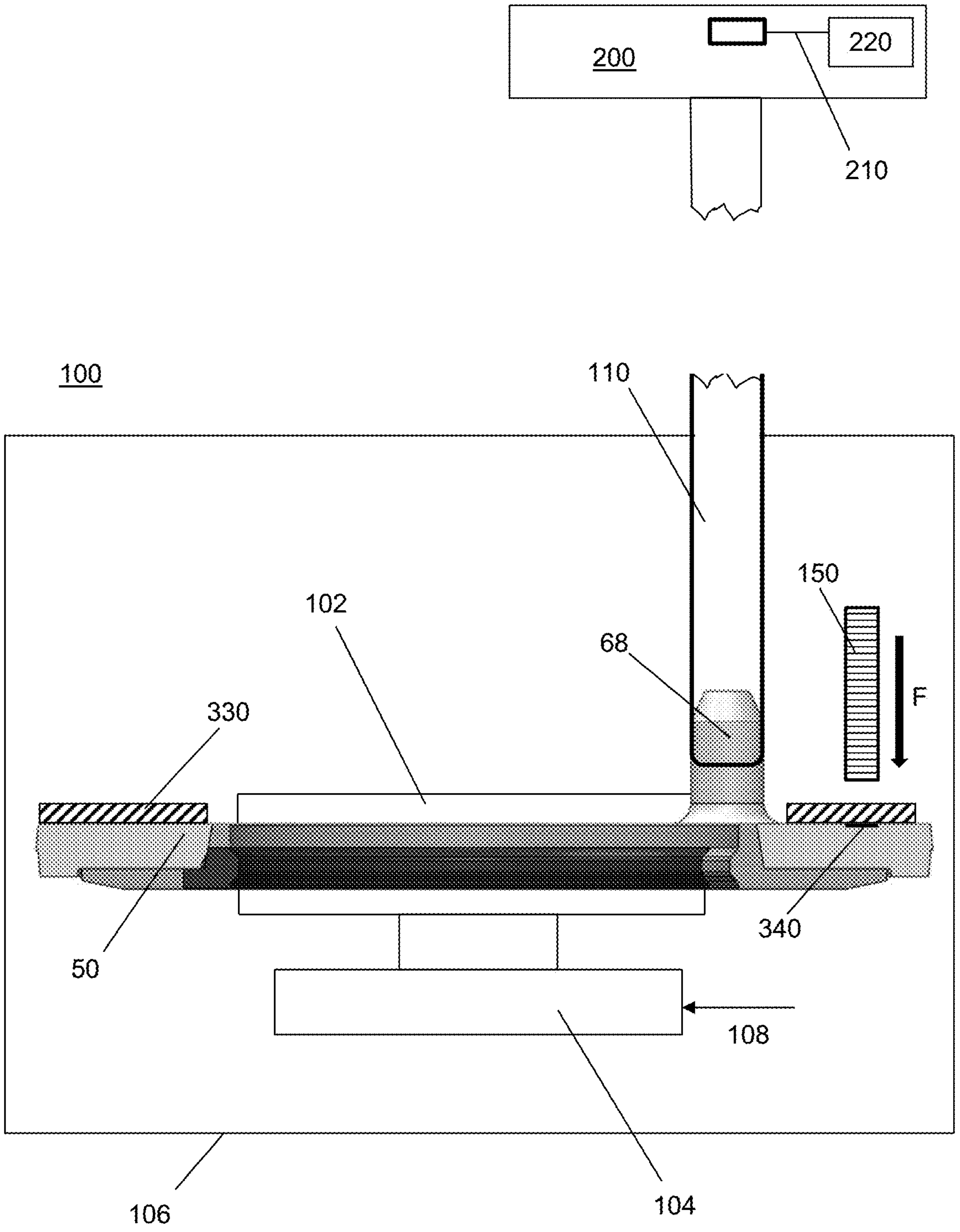
FIGS. 12A-12C are pictorial diagrams showing exemplary pumps incorporating one (FIG. 12A), three (FIG. 12B) and eight (FIG. 12C) microfluidic devices of FIG. 5A.
Figure 12B:
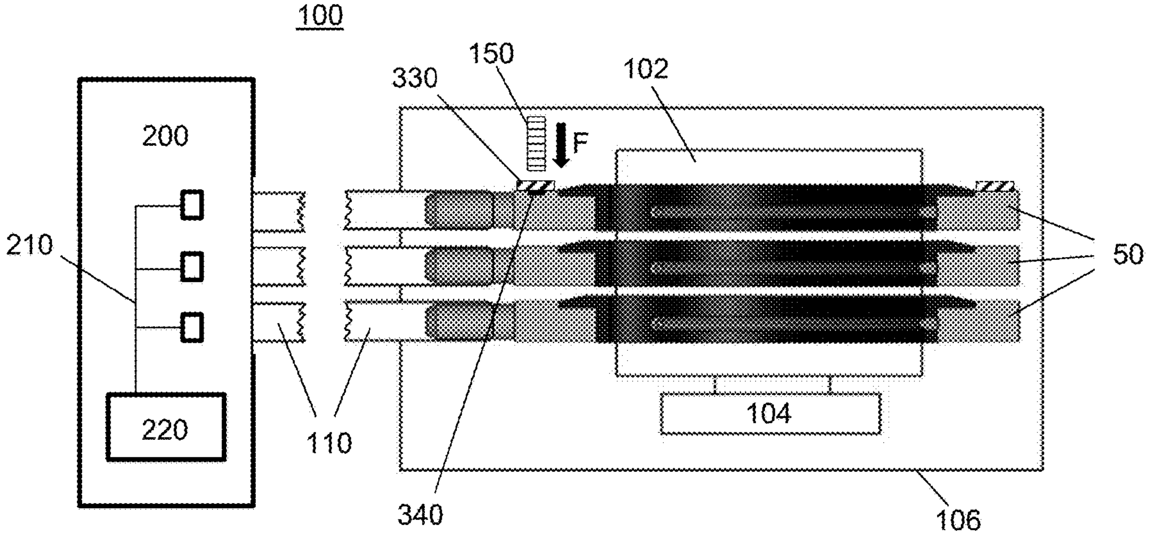
Figure 12C:
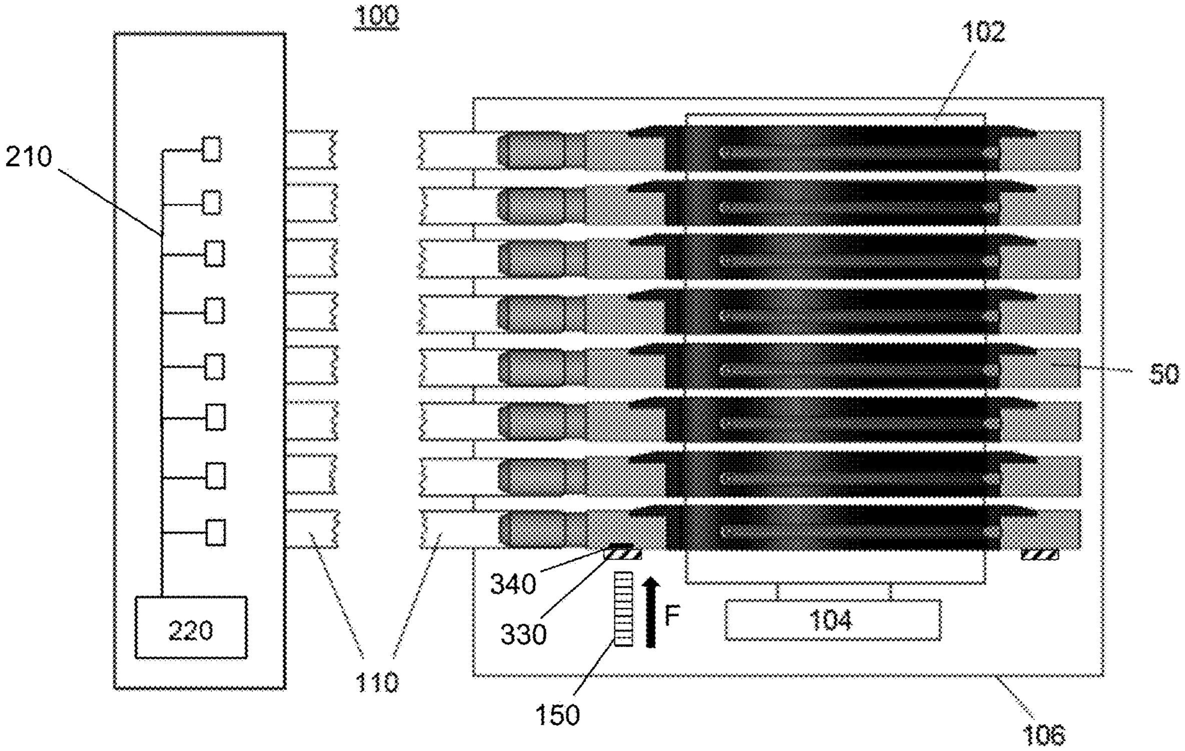

Referring now to FIGS. 12A-12C, in another aspect, a microfluidic pump 100 is provided, which utilizes the microfluidic device (10, 50), described herein. The microfluidic pump 100 includes one or more microfluidic devices (10, 50) and a rotary actuator 102 configured to compress a portion of the first surface 74 of the elastic member 72 of the microfluidic device(s) (10, 50) as the actuator rotates. It should be understood that while FIG. 12A is shown with a single microfluidic device (10, 50), any number of microfluidic devices (10, 50) may be provided on the actuator 102 to form a multichannel pump 100. In various embodiments, as shown in FIGS. 12B and 12C, the pump 100 may include 1-8 (i.e., 1, 2, 3, 4, 5, 6, 7, or 8) microfluidic devices (10, 50). In various embodiments, the pump 100 includes 1 or 3 microfluidic devices (10, 50).

Thus, mechanical rotation of the actuator 102 results in translation of the site of compression along the length of the curved slot 96 of the microfluidic device (10, 50), thereby creating an effective pumping action resulting in the flow of fluid within the channel 82 in the direction of the advancing actuator 102. The flow of fluid may then exit through the appropriate inlet/outlet connector 68 and into, e.g., tubing 110 attached thereto. Such tubing may provide fluid communication between the pump 100 and a process, test analyzer, drug delivery device, or industrial application, as may be appreciated by one of skill in the art.

As discussed above, a generally curved channel 82 and/or recess YY allows for fluid to be advanced through the channel(s) (35, 82) of the microfluidic device (10, 50) by compression of the elastic member (28, 72) into the channel (35, 82) without substantially deforming the channel (35, 82) as the actuator 102 rotates, thereby translating the compression along the curved slot(s) (14, 96) of the microfluidic device (10, 50). In various embodiments, mechanical rotation of the actuator 102 may be accomplished by an electric motor 104 coupled to the actuator 102. The electric motor 104 and actuator 102 may be provided in a housing 106 such that the actuator 102 is configured to radially traverse one or more elastic members 72 of the microfluidic device (10, 50) when the microfluidic device is placed in contact with the actuator 102. As will be appreciated by those of skill in the art, the rotational direction of the actuator 102 with relation to the microfluidic device (10, 50) dictates the direction of flow within the channel(s) 82. As such, one skilled in the art would appreciate that, advantageously, fluid flow through the pump 100 may be bidirectional.

In various embodiments, the pump 100 also includes at least one piston 150 configured to apply force (F) onto the integrated valve of the microfluidic device (10, 50), wherein the application of force (F) deforms the flexible layer 330 to contact the valve seat 340 and substantially close the valve 300. As will be appreciated, while a single piston 150 is shown the pump 100 may include any number of pistons configured to apply force (F) onto any number of integrated valves 300 of the microfluidic device (10, 50).

The actuator 102 may therefore be rotated by applying a voltage 108 to the electric motor 104 controlling movement thereof. As such, the invention further provides a method for performing a microfluidic process which includes applying a voltage 108 to a microfluidic pump 100 as described herein. The applied voltage 108 activates the motor 104, which advances at least one actuator 102 or deformation element attached thereto, which are rotatably engaged with the elastic member 72 of the microfluidic device (10, 50). Such rotation causes deformation of the elastic member 72 into the corresponding groove 62, thereby occluding at least a portion of the channel 82.

A wide range of pulses per second may be applied to the electric motor 104, thereby effectuating a wide range of flow rates within the microfluidic device 10 or 50. The fluid flow may be essentially constant, with little or no shear force being imposed on the fluid, even at very low flow rates. These characteristics of the pump enhance the accuracy of analyses performed with it (e.g., analyte integrity is preserved by minimizing exposure of sample components to shear and degradation), while low flow rates provide sufficient time for chemical reactions to occur. A low, constant pumped flow rate can also be very useful in drug delivery, to ensure dosing accuracy.

In one embodiment, between 100 and 10,000 pulses per second may be applied to the electric motor 104, resulting in a flow rate of between about 0.001 μl/s to 5.0 μl/s through the channels. The design of the present invention allows forces within the channels 82 to remain fairly constant over a wide range of applied pulses.

In various embodiments, the inlet/outlet connectors 68 of the microfluidic device 10 or 50 may be connected to one or more microfluidic analyzers 200. Such connectivity may be effected by means of tubing 110 and/or channels formed in intermediate substrates to which the microfluidic device (10, 50) and the microfluidic analyzer 200 may be attached, thereby establishing fluid communication between the microfluidic device 10 or 50 and the microfluidic analyzer 200. The microfluidic analyzer 200 and/or the intermediate substrate may include one or more microchannels 210 and/or reservoirs 220 provided with various reagents, immobilized therein or otherwise provided such that a biological assay may be performed on a fluid sample.

The following embodiment describes the use of a microfluidic pump 100 of the present invention for use in low cost diagnostic products consisting of an instrument and consumable, where the consumable requires sealing due to a potential high risk of contamination. Two aspects are described. First, a very low cost method to perform pumping a liquid sample to stored dry chemicals which are deposited at a location internal to the consumable, followed by mixing of the liquid sample with the stored chemicals. Second, dilution of chemicals using the same active pumping system where the dilution step occurs part way through the diagnostic process. The two aspects may be used together or individually.

The method to perform pumping of sample fluids to deposited chemicals followed by mixing of sample fluid with deposited chemicals in a low cost manner involves using only one actuator 102, for example a DC or stepper motor 104 incorporated into the instrument 100. As described above, the microfluidic device (10, 50) includes one or more curved annular channels (35, 82) defined in part by the elastic member (28, 72), which is deformed by the pump actuators 102 or rollers. In fluid communication with the microfluidic device (10, 50) (or, in some embodiments, concentric to the channels (35, 82)) is a mixing chamber which contains a magnetic or magnetized puck or ball bearings. Magnetically coupled to the puck or ball bearings is a magnetic mixing head that may agitate or otherwise move the puck in concert with the actuator 102.

By providing inlet and outlet ports to the mixing chamber from the channels 82 of the microfluidic device (10, 50), fluid can be pumped from the pump channels 82 into the mixing chamber as the motor 104 rotates in a predetermined direction. The instrument component (i.e., analyzer 200) of the pump 100 comprises a suitable mechanism to provide pumping and mixing functionality when the motor 104 is rotated in a certain direction, but only mixing functionality when the motor 104 is rotated in the opposite direction, for example a ratchet system implemented by a pawl and a compression spring, whereby the mixing head rotates with the pump rollers in one rotational direction of the motor 104 and whereby the pump rollers 102 disengage from the motor 104 when the motor 104 rotates in the other direction, thus providing rotation of the mixing head only. The compression spring may also provide the necessary contact force on the pump channels 82 to facilitate effective pumping.

The following will describe an exemplary method to perform a dilution step during diagnostic test using the microfluidic devices (10, 50) described herein. In this embodiment, two curved pump channels (35, 82) are included in the microfluidic device (10, 50), each having their own fluid path, for example, the inner channel provides fluidic pumping of the sample fluid and the outer channel provides fluidic pumping for a dilution fluid. Each channel (35, 82) may be compressed with the same pump rollers or actuators 102, such that rotation of the drive shaft by the electric motor 104 causes both sample fluid and buffer/dilution fluid to be pumped. As discussed above, should more fluids be required to be pumped in separate channels (35, 82), the microfluidic devices (10, 50) can be formed to accommodate multiple fluidic channels (35, 82) in parallel, if desired. In this embodiment the sample that is transported is first required to be mixed with stored deposited chemicals located within a mixing chamber in fluid communication with a channel (35, 82), followed by a dilution step using a dilution fluid.

It is preferable to store the dilution fluid away from the stored chemicals so the stored chemicals do not become affected by the dilution fluid. When the motor 104 rotates in a certain direction the pump rollers or actuators 102 engage the elastic member 72 of the microfluidic device (10, 50) to transport both sample fluid and dilution fluid into a chamber of the microfluidic analyzer 200. As the mixing chamber fills with sample fluid, the dilution fluid fills a secondary chamber which is sized according to the amount of dilution fluid required and the geometry of the dilution fluid pumping channels (35, 82) and the mixing chamber volume. When the motor 104 stops both dilution fluid and sample fluid remain in their respective chambers.

If mixing is required, an equivalent mechanism as described above could be implemented which rotates the motor 104 in the opposite direction to only provide mixing. When the sample fluid and dilution fluid are required to be combined, the motor 104 rotates to engage the pump rollers/actuators 102 which transport the sample and dilution fluid to a location within the microfluidic analyzer 200 (or microfluidic device 10 or 50) which combines the two fluids. To assist combining the two fluids, passive mixing features may be included at the fluid combining region. As the motor 104 continues to rotate to pump 100 the two fluids, the diluted sample can be transported to another location within the analyzer, for example a location to carry out detection of an analyte.

Although the invention has been described with reference to the above disclosure, it will be understood that modifications and variations are encompassed within the spirit and scope of the invention. Accordingly, the invention is limited only by the following claims.

What is claimed is:

1. A microfluidic device comprising:

a) a rigid substrate having a top surface and a bottom surface, and comprising an aperture disposed therethrough;

b) a first groove formed within a portion of an inner surface of the aperture;

c) a first inlet port and a first outlet port formed at first and second ends of the first groove;

d) a collar fixedly attached to the rigid substrate, wherein the collar is sized and shaped to fit within the aperture, wherein the collar comprises a first curved slot formed within an inner surface thereof, and wherein the first curved slot is positioned adjacent to the first groove of the aperture;

e) a first elastic member disposed within the first curved slot and configured to form a first channel with the first groove of the aperture; and f) one or more first valves disposed in the rigid substrate and positioned in alignment with the first inlet port, the first outlet port, or both the first inlet port and the first outlet port.

2. The microfluidic device of claim 1, further comprising an inlet connector and an outlet connector, each being disposed on an exterior side surface of the rigid substrate and each being respectively in fluid communication with the first inlet port and the first outlet port of the first groove.

3. The microfluidic device of claim 1, wherein the first groove is positioned at an edge of the inner surface adjacent to the top or bottom surface of the rigid substrate.

4. The microfluidic device of claim 1, wherein the first valve comprises a valve seat disposed within the rigid substrate, wherein the rigid substrate further comprises an annular ring disposed in alignment with the aperture, and wherein a flexible layer is fixedly attached to the annular ring.

5. The microfluidic device of claim 1, wherein the first valve comprises a valve seat disposed within a flexible layer fixedly attached to the rigid substrate.

6. The microfluidic device of claim 1, wherein the first valve comprises a first valve seat disposed within the rigid substrate, wherein a flexible layer comprising a second valve seat is fixedly attached to the rigid substrate, and wherein the first valve seat and second valve seat are in alignment with one another.

7. The microfluidic device of claim 5, wherein the flexible layer is formed from thermoplastic elastomer or plastic foil.

8. The microfluidic device of claim 5, wherein the flexible layer is laser welded to the annular ring.

9. The microfluidic device of claim 5, wherein the flexible layer and the first elastic member are formed as a single unit.

10. The microfluidic device of claim 1, further comprising:

g) one or more second grooves formed within a portion of the inner surface of the aperture and positioned substantially parallel to the first groove;

h) one or more second inlet ports and second outlet ports, each formed at first and second ends of the one or more second grooves;

i) one or more second curved slots formed within the inner surface of the collar, each being positioned adjacent to each of the one or more second grooves of the aperture;

j) one or more second elastic members, each disposed within each of the one or more second curved slots, wherein a first surface of each of the one or more second elastic members forms one or more second channels along the one or more second grooves of the aperture; and k) one or more second valves disposed within the rigid substrate and positioned in alignment with the second inlet ports, the second outlet ports, or both the second inlet ports and the second outlet ports.

11. A microfluidic device comprising:

a) a rigid substrate having a top surface and a bottom surface, and comprising an aperture disposed therethrough;

b) a first inlet port and a first outlet port formed within a portion of an inner surface of the aperture;

c) a collar fixedly attached to the aperture and comprising a first curved slot formed within an inner surface thereof, wherein the first curved slot is positioned along the inner surface;

d) a first elastic member comprising a recess along a length and disposed within the first curved slot, wherein the recess is configured to form a first channel with the inner surface of the aperture; and e) one or more first valves positioned in alignment with the first inlet port, the first outlet port, or both the first inlet port and the first outlet port.

12. The microfluidic device of claim 11, further comprising an inlet connector and an outlet connector, each being respectively in fluid communication with the first inlet port and the first outlet port.

13. The microfluidic device of claim 11, further comprising a groove disposed in the inner surface of the aperture and configured to form a channel with the recess.

14. The microfluidic device of claim 11, wherein the first valve comprises a valve seat disposed within the rigid substrate, wherein the rigid substrate further comprises an annular ring disposed in alignment with the aperture, and wherein a flexible layer is fixedly attached to the annular ring.

15. The microfluidic device of claim 11, wherein the first valve comprises a valve seat disposed within a flexible layer fixedly attached to the rigid substrate.

16. The microfluidic device of claim 11, wherein the first valve comprises a first valve seat disposed within the rigid substrate, wherein a flexible layer comprising a second valve seat is fixedly attached to the rigid substrate, and wherein the first valve seat and second valve seat are in alignment with one another.

17. The microfluidic device of claim 14, wherein the flexible layer is formed from thermoplastic elastomer or plastic foil.

18. The microfluidic device of claim 14, wherein the flexible layer and the first elastic member are formed as a single unit.

19. The microfluidic device of claim 11, further comprising:

f) one or more second curved slots formed within the inner surface of the collar and positioned substantially parallel to the first curved slot;

g) one or more second inlet ports and second outlet ports, each formed within the inner surface of the aperture in alignment with the one or more second curved slots;

h) one or more second elastic members comprising a recess along a length, each disposed within each of the one or more second curved slots and configured to form one or more second channels with the inner surface of the aperture; and i) one or more second valves positioned in alignment with the second inlet ports, the second outlet ports, or both the second inlet ports and the second outlet ports.

20. A pump comprising:

a) one or more microfluidic devices as set forth in claim 8;

b) a rotatable actuator inserted into the aperture that is sized to radially traverse and compress a portion of a surface of the first elastic member into the channel without substantially deforming the channel, wherein compression is translated along the curved slot as the actuator rotates; and c) at least one piston configured to press against the valve, which deforms the flexible layer to substantially close the valve.

* * * * *